US006931309B2

(12) United States Patent
Phelan et al.

(10) Patent No.: US 6,931,309 B2
(45) Date of Patent: Aug. 16, 2005

(54) MOTOR VEHICLE OPERATING DATA COLLECTION AND ANALYSIS

(75) Inventors: Joseph Phelan, The Woodlands, TX (US); Johannes Abraham Perquin, The Woodlands, TX (US)

(73) Assignee: Innosurance, Inc., The Woodlands, TX (US)

( * ) Notice: Subject to any disclaimer, the term of this patent is extended or adjusted under 35 U.S.C. 154(b) by 0 days.

(21) Appl. No.: 10/832,521

(22) Filed: Apr. 27, 2004

(65) Prior Publication Data

US 2004/0225557 A1 Nov. 11, 2004

Related U.S. Application Data

(60) Provisional application No. 60/467,845, filed on May 6, 2003.

(51) Int. Cl.⁷ .................. G05D 1/00; G01M 17/00; B60Q 1/00
(52) U.S. Cl. .................. 701/1; 701/35; 701/207; 340/439; 340/441
(58) Field of Search .................. 701/1, 35, 207; 340/439, 441

(56) References Cited

U.S. PATENT DOCUMENTS

| 4,007,438 A | * | 2/1977 | Protonantis | 340/466 |
|---|---|---|---|---|
| 5,797,134 A | * | 8/1998 | McMillan et al. | 705/400 |
| 5,819,198 A | * | 10/1998 | Peretz | 701/117 |
| 6,064,970 A | * | 5/2000 | McMillan et al. | 705/4 |
| 6,067,489 A | * | 5/2000 | Letang et al. | 701/36 |
| 6,438,472 B1 | * | 8/2002 | Tano et al. | 701/35 |
| 6,473,000 B1 | * | 10/2002 | Secreet et al. | 340/936 |
| 6,636,790 B1 | | 10/2003 | Lightner | |
| 6,771,176 B2 | * | 8/2004 | Wilkerson | 340/576 |
| 2001/0033225 A1 | | 10/2001 | Razavi | |
| 2002/0022920 A1 | * | 2/2002 | Straub | 701/93 |
| 2002/0049538 A1 | | 4/2002 | Knapton | |
| 2002/0111735 A1 | * | 8/2002 | McKenzie et al. | 701/114 |
| 2002/0123834 A1 | * | 9/2002 | Ogaki | 701/35 |
| 2002/0178033 A1 | * | 11/2002 | Yoshioka et al. | 705/4 |
| 2003/0195694 A1 | | 10/2003 | Kozak | |
| 2003/0216857 A1 | | 11/2003 | Feldman | |
| 2004/0083041 A1 | | 4/2004 | Skeen | |
| 2004/0153362 A1 | | 8/2004 | Bauer | |

OTHER PUBLICATIONS

Dec. 19, 2003 print-out of Davis CarChip web page. (2 pgs.).
Jan. 1, 2004 print-out of Alltrack USA web page for "Real-Time Tracking" and "Passive-Tracking". (11 pgs.).

* cited by examiner

*Primary Examiner*—Thomas G. Black
*Assistant Examiner*—Brian J Broadhead
(74) *Attorney, Agent, or Firm*—Law Office of David McEwing

(57) ABSTRACT

A method and apparatus for collecting, uploading and evaluating motor vehicle operation utilizing on-board diagnostic components (OBDII) and ground positioning satellite (GPS) systems whereby operator identifiable behavior can be rated for driving safety and other characteristics.

16 Claims, 29 Drawing Sheets

IDENTIFY SPEED VIOLATIONS

IDENTIFY VIOLATIONS

CALCULATE DSR

Trip Violations

Trip 2 December 29, 2003    Traffic Violations 82.99 82.99 DSR without persistent events: DSR.

| Start Time | End Time | Type | Description | | Severity |
|---|---|---|---|---|---|
| 1:55:29 PM | 1:55:33 PM | Speed limit | 1-5 MPH over-Speed limit: | 25MPH, speed: 27MPH | 1 |
| 1:55:35 PM | 1:55:39 PM | Speed limit | 5-10 MPH over-Speed limit: | 25MPH, speed: 31MPH | 2 |
| 1:55:41 PM | 1:56:03 PM | Speed limit | 1-5 MPH over-Speed limit: | 25MPH, speed: 30MPH | 1 |
| 1:56:17 PM | 1:56:17 PM | Speed limit | 1-5 MPH over-Speed limit: | 25MPH, speed: 27MPH | 1 |
| 1:56:19 PM | 1:56:21 PM | Speed limit | 5-10 MPH over-Speed limit: | 25MPH, speed: 31MPH | 2 |
| 1:56:23 PM | 1:56:27 PM | Speed limit | 10-15 MPH over-Speed limit: | 25MPH, speed: 36MPH | 3 |
| 1:56:29 PM | 1:56:33 PM | Speed limit | 5-10 MPH over-Speed limit: | 25MPH, speed: 35MPH | 2 |
| 1:56:35 PM | 1:56:37 PM | Speed limit | 10-15 MPH over-Speed limit: | 25MPH, speed: 36MPH | 3 |
| 1:56:39 PM | 1:56:39 PM | Speed limit | 5-10 MPH over-Speed limit: | 25MPH, speed: 35MPH | 2 |
| 1:56:41 PM | 1:56:47 PM | Speed limit | 10-15 MPH over-Speed limit: | 25MPH, speed: 36MPH | 3 |
| 1:56:49 PM | 1:56:55 PM | Speed limit | 15-20 MPH over-Speed limit: | 25MPH, speed: 44MPH | 4 |
| 1:56:57 PM | 1:56:57 PM | Speed limit | 10-15 MPH over-Speed limit: | 25MPH, speed: 36MPH | 3 |
| 1:56:59 PM | 1:57:01 PM | Speed limit | 1-5 MPH over-Speed limit: | 25MPH, speed: 27MPH | 1 |
| 1:57:03 PM | 1:57:03 PM | Speed limit | 5-10 MPH over-Speed limit: | 25MPH, speed: 35MPH | 2 |
| 1:57:05 PM | 1:57:07 PM | Speed limit | 15-20 MPH over-Speed limit: | 25MPH, speed: 41MPH | 4 |
| 1:57:09 PM | 1:57:29 PM | Speed limit | 20+ MPH over-Speed limit: | 25MPH, speed: 50MPH | 5 |
| 1:57:31 PM | 1:57:45 PM | Speed limit | 15-20 MPH over-Speed limit: | 25MPH, speed: 44MPH | 4 |
| 1:57:47 PM | 1:57:47 PM | Speed limit | 5-10 MPH over-Speed limit: | 25MPH, speed: 35MPH | 2 |
| 1:57:59 PM | 1:57:59 PM | Speed limit | 1-5 MPH over-Speed limit: | 15MPH, speed: 16MPH | 1 |
| 2:05:07 PM | 2:05:07 PM | Speed limit | 1-5 MPH over-Speed limit: | 25MPH, speed: 29MPH | 1 |

FIG. 19A
REVISED SHEET

| | | | | |
|---|---|---|---|---|
| 2:05:09 PM | 2:05:09 PM | Speed limit | 10-15 MPH over-Speed limit: 25MPH, speed: 37MPH | 3 |
| 2:05:11 PM | 2:05:11 PM | Speed limit | 15-20 MPH over-Speed limit: 25MPH, speed: 44MPH | 4 |
| 2:05:13 PM | 2:05:21 PM | Speed limit | 20+ MPH over-Speed limit: 25MPH, speed: 47MPH | 5 |
| 2:05:23 PM | 2:05:31 PM | Speed limit | 15-20 MPH over-Speed limit: 25MPH, speed: 45MPH | 4 |
| 2:05:33 PM | 2:05:45 PM | Speed limit | 20+ MPH over-Speed limit: 25MPH, speed: 46MPH | 5 |
| 2:05:47 PM | 2:05:49 PM | Speed limit | 15-20 MPH over-Speed limit: 25MPH, speed: 45MPH | 4 |
| 2:05:51 PM | 2:05:59 PM | Speed limit | 20+ MPH over-Speed limit: 25MPH, speed: 47MPH | 5 |
| 2:06:01 PM | 2:06:01 PM | Speed limit | 15-20 MPH over-Speed limit: 25MPH, speed: 42MPH | 4 |
| 2:06:03 PM | 2:06:03 PM | Speed limit | 10-15 MPH over-Speed limit: 25MPH, speed: 36MPH | 3 |
| 2:06:05 PM | 2:06:05 PM | Speed limit | 5-10 MPH over-Speed limit: 25MPH, speed: 31MPH | 2 |
| 2:06:37 PM | 2:06:37 PM | Speed limit | 1-5 MPH over-Speed limit: 25MPH, speed: 27MPH | 1 |
| 2:06:39 PM | 2:06:39 PM | Speed limit | 5-10 MPH over-Speed limit: 25MPH, speed: 31MPH | 2 |
| 2:06:41 PM | 2:06:47 PM | Speed limit | 10-15 MPH over-Speed limit: 25MPH, speed: 36MPH | 3 |
| 2:06:49 PM | 2:06:59 PM | Speed limit | 15-20 MPH over-Speed limit: 25MPH, speed: 41MPH | 4 |
| 2:07:03 PM | 2:07:45 PM | Speed limit | 20+ MPH over-Speed-limit: 25MPH, speed: 49MPH | 5 |
| 2:07:47 PM | 2:08:11 PM | Speed limit | 15-20 MPH over-Speed limit: 25MPH, speed: 45MPH | 4 |
| 2:08:13 PM | 2:08:53 PM | Speed limit | 20+ MPH over-Speed limit: 25MPH, speed: 46MPH | 5 |
| 2:08:55 PM | 2:08:57 PM | Speed limit | 15-20 MPH over-Speed limit: 25MPH, speed: 45MPH | 4 |
| 2:08:59 PM | 2:08:59 PM | Speed limit | 10-15 MPH over-Speed limit: 25MPH, speed: 39MPH | 3 |
| 2:09:01 PM | 2:09:01 PM | Speed limit | 5 - 10 MPH over-Speed limit: 25MPH, speed: 34MPH | 2 |
| 2:09:03 PM | 2:09:09 PM | Speed limit | 1-5 MPH over-Speed limit: 25MPH, speed: 29MPH | 1 |
| 2:09:11 PM | 2:09:11 PM | Speed limit | 5-10 MPH over-Speed limit: 25MPH, speed: 32MPH | 2 |
| 2:09:13 PM | 2:09:13 PM | Speed limit | 10-15 MPH over-Speed limit: 25MPH, speed: 37MPH | 3 |
| 2:09:15 PM | 2:09:19 PM | Speed limit | 15-20 MPH over-Speed limit: 25MPH, speed: 41MPH | 4 |
| 2:09:21 PM | 2:09:33 PM | Speed limit | 20+ MPH over-Speed limit: 25MPH, speed: 47MPH | 5 |
| 2:09:35 PM | 2:09:35 PM | Speed limit | 15-20 MPH over-Speed limit: 25MPH, speed: 45MPH | 4 |
| 2:09:37 PM | 2:09:37 PM | Speed limit | 10-15 MPH over-Speed limit: 25MPH, speed: 39MPH | 3 |

FIG. 19B

| | | | | |
|---|---|---|---|---|
| 2:09:39 PM | 2:09:39 PM | Speed limit | 1-5 MPH over-Speed limit: 25MPH, speed: 29MPH | 1 |
| 2:09:53 PM | 2:09:53 PM | Speed limit | 5-10 MPH over-Speed limit: 20MPH, speed: 30MPH | 2 |
| 2:09:55 PM | 2:09:55 PM | Speed limit | 10-15 MPH over-Speed limit: 20MPH, speed: 34MPH | 3 |
| 2:09:57 PM | 2:09:57 PM | Speed limit | 15-20 MPH over-Speed limit: 20MPH, speed: 38MPH | 4 |
| 2:09:59 PM | 2:10:11 PM | Speed limit | 20+ MPH over-Speed limit: 20MPH, speed: 42MPH | 5 |
| 2:10:13 PM | 2:10:13 PM | Speed limit | 15-20 MPH over-Speed limit: 20MPH, speed: 40MPH | 4 |
| 2:10:15 PM | 2:10:15 PM | Speed limit | 10-15 MPH over-Speed limit: 20MPH, speed: 32MPH | 3 |
| 2:10:17 PM | 2:10:17 PM | Speed limit | 1-5 MPH over-Speed limit: 20MPH, speed: 23MPH | 1 |
| 2:10:25 PM | 2:10:25 PM | Speed limit | 1-5 MPH over-Speed limit: 20MPH, speed: 22MPH | 1 |
| 2:10:27 PM | 2:10:27 PM | Speed limit | 5-10 MPH over-Speed limit: 20MPH, speed: 27MPH | 2 |
| 2:10:29 PM | 2:10:31 PM | Speed limit | 10-15 MPH over-Speed limit: 20MPH, speed: 31MPH | 3 |
| 2:10:33 PM | 2:10:35 PM | Speed limit | 15-20 MPH over-Speed limit: 20MPH, speed: 37MPH | 4 |
| 2:10:37 PM | 2:10:49 PM | Speed limit | 20+ MPH over-Speed limit: 20MPH, speed: 42MPH | 5 |
| 2:10:51 PM | 2:10:51 PM | Speed limit | 10-15 MPH over-Speed limit: 20MPH, speed: 34MPH | 3 |
| 2:10:53 PM | 2:10:53 PM | Speed limit | 1-5 MPH over-Speed limit: 20MPH, speed: 24MPH | 1 |
| 2:11:05 PM | 2:11:05 PM | Speed limit | 1-5 MPH over-Speed limit: 20MPH, speed: 22MPH | 1 |
| 2:11:07 PM | 2:11:07 PM | Speed limit | 5-10 MPH over-Speed limit: 20MPH, speed: 27MPH | 2 |
| 2:11:09 PM | 2:11:11 PM | Speed limit | 10-15 MPH over-Speed limit: 20MPH, speed: 31MPH | 3 |
| 2:11:13 PM | 2:11:13 PM | Speed limit | 15-20 MPH over-Speed limit: 20MPH, speed: 37MPH | 4 |
| 2:11:15 PM | 2:11:45 PM | Speed limit | 20+ MPH over-Speed limit: 20MPH, speed: 41MPH | 5 |
| 2:11:47 PM | 2:11:47 PM | Speed limit | 15-20 MPH over-Speed limit: 20MPH, speed: 39MPH | 4 |
| 2:11:49 PM | 2:11:49 PM | Speed limit | 10-15 MPH over-Speed limit: 20MPH, speed: 32MPH | 3 |
| 2:11:51 PM | 2:11:51 PM | Speed limit | 1-5 MPH over-Speed limit: 20MPH, speed: 23MPH | 1 |
| 2:12:09 PM | 2:12:09 PM | Speed limit | 1-5 MPH over-Speed limit: 20MPH, speed: 22MPH | 1 |
| 2:12:11 PM | 2:12:11 PM | Speed limit | 5-10 MPH over-Speed limit: 20MPH, speed: 27MPH | 2 |
| 2:12:13 PM | 2:12:13 PM | Speed limit | 10-15 MPH over-Speed limit: 20MPH, speed: 31MPH | 3 |
| 2:12:15 PM | 2:12:17 PM | Speed limit | 15-20 MPH over-Speed limit: 20MPH, speed: 36MPH | 4 |

FIG. 19C

| | | | |
|---|---|---|---|
| 2:12:19 PM | 2:12:19 PM | Speed limit | 20+ MPH over-Speed limit: 20MPH, speed: 41MPH | 3 |
| 2:12:21 PM | 2:12:21 PM | Speed limit | 15-20 MPH over-Speed limit: 20MPH, speed: 37MPH | 4 |
| 2:12:23 PM | 2:12:23 PM | Speed limit | 5-10 MPH over-Speed limit: 20MPH, speed: 28MPH | 2 |
| 2:12:25 PM | 2:12:25 PM | Speed limit | 1-5 MPH over-Speed limit: 20MPH, speed: 21MPH | 1 |
| 2:12:27 PM | 2:12:27 PM | Speed limit | 5-10 MPH over-Speed limit: 15MPH, speed: 25MPH | 2 |
| 2:12:29 PM | 2:12:29 PM | Speed limit | 15-20 MPH over-Speed limit: 15MPH, speed: 32MPH | 4 |
| 2:12:31 PM | 2:12:59 PM | Speed limit | 20+ MPH over-Speed limit: 15MPH, speed: 36MPH | 5 |
| 2:13:01 PM | 2:13:03 PM | Speed limit | 15-20 MPH over-Speed limit: 20MPH, speed: 37MPH | 4 |
| 2:13:05 PM | 2:13:07 PM | Speed limit | 10-15 MPH over-Speed limit: 20MPH, speed: 35MPH | 3 |
| 2:13:09 PM | 2:13:13 PM | Speed limit | 1-5 MPH over-Speed limit: 15MPH, speed: 19MPH | 1 |
| 2:13:15 PM | 2:13:21 PM | Speed limit | 5-10 MPH over-Speed limit: 15MPH, speed: 22MPH | 2 |

Trip 1

Trip Streets

| Start Time | End Time (27-2B) | Street name (27-1) | Speed limit (MPH) (27-3) |
|---|---|---|---|
| 1/26/2004 12:33:06 PM | 1/26/2004 12:35:32 PM | ALDEN BRIDGE DR | 20 |
| 1/26/2004 12:35:32 PM | 1/26/2004 12:36:22 PM | RESEARCH FOREST DR | 20 |
| 1/26/2004 12:36:22 PM | 1/26/2004 12:40:22 PM | RESEARCH FOREST DR | 26 |
| 1/26/2004 12:40:22 PM | 1/26/2004 12:40:24 PM | RESEARCH FOREST DR | 5 |
| 1/26/2004 12:40:24 PM | 1/26/2004 12:43:24 PM | RESEARCH FOREST DR | 25 |
| 1/26/2004 12:43:24 PM | 1/26/2004 12:46:39 PM | INTERSTATE 45 N | 25 |
| 1/26/2004 12:45:39 PM | 1/26/2004 12:45:40 PM | WOODLANDS PKWY | 15 |
| 1/26/2004 12:45:40 PM | 1/26/2004 12:45:44 PM | I 45 | 25 |
| 1/26/2004 12:45:44 PM | 1/26/2004 12:47:06 PM | NURSERY RD | 20 |
| 1/26/2004 12:47:06 PM | 1/26/2004 12:47:24 PM | NURSERY RD | 20 |
| 1/26/2004 12:47:24 PM | 1/26/2004 12:48:10 PM | OAK RIDGE DR | 20 |

FIG. 27

MOTOR VEHICLE OPERATING DATA COLLECTION AND ANALYSIS

CROSS REFERENCE TO RELATED APPLICATION

This application claims the benefit of and priority to U.S. Provisional Application No. 60/467,845 entitled "Motor Vehicle Operating Data Gathering Methodology and Analysis for Eventual Use with Underwriter Statistic Metrics" and filed May 6, 2003.

BACKGROUND OF INVENTION

1. Field of Use

The invention pertains to a method and apparatus for evaluating recorded data of a driver's operation of a motor vehicle. The invention utilizes time marked data that can be correlated with information from separate data bases, particularly data that is also time marked. The recorded data may facilitate the vehicle owner monitoring the use of the vehicle by others, e.g., employees, automobile renters or family members, e.g., teenage drivers. The recorded data may also provide an objective behavioral data collection system for third parties, e.g., life and health insurance companies, lending institutions, potential employers, to evaluate an individual's behavioral characteristics in a real life and commonly experienced situation, i.e., driving a motor vehicle.

2. Prior Art

Several commercial mechanisms are available on the market that provide means to monitor vehicle use. One example is the Alltrackusa product that relies on a global positioning satellite (GPS) system to track vehicle operation. Such systems employ a calculating methodology to determine speed and acceleration by using the position differential implied by the GPS. Conversely, Davis Technologies markets the CarChip product which is a passive OBDII data recorder for hobbyists and car enthusiasts who want to record their engine performance. The shortcomings of the Alltrackusa "GPS only" application is that actual speed information is not available during intermittent losses of the GPS signal, which are frequent. This limits the product's usefulness for creating a complete dataset suitable for developing a useful and objective driver safety ratings. The shortcoming of the CarChip product is that the unit does not provide GPS capability and the target market is for car enthusiasts who want to monitor engine diagnostics. Both existing technology developments have the inherent shortcoming of local data storage and reporting. This feature limits the usefulness of the data and does not allow for the development of an independent rating system.

U.S. Pat. No. 6,064,970, assigned to Progressive Casualty Insurance Company, discloses a method and system for determining the cost of automobile insurance based upon monitoring, recording and communicating data representative of operator and vehicle driving characteristics. The system includes use of a wireless up-link to a central control station to communicate "triggering events".

U.S. Pat. No. 6,064,970 defines a methodology for private insurance quotes based on endogenous driver variables that are acquired from the customer or collected by the insurance company. U.S. Pat. No. 6,064,970 does not teach an apparatus and business process that allows customers to voluntarily create datasets that are then objectively interpreted by a third party and converted to objective safety ratings, much as credit payments or delinquencies are converted to an objective credit rating, or company debt histories converted to a bond rating. This distinction is vital in order to promote the adoption of driver monitoring technology and guarantee that it is utilized in a manner that promotes the most societal good, rather than simply being the exclusive purview of one company's insurance premium pricing structure.

The existing systems and devices also ignore the profound behavioral characteristics exhibited by drivers in operating motor vehicles, e.g., aggressiveness or patience, caution or recklessness, compliance with laws etc. These characteristics are relevant to each individual's behavior in other situations including performance of job duties, behavior in stress, and meeting obligations owed to others. These behaviors cannot be ascertained unless the information is uploaded to a central server to create a comprehensive database for comparison and development of useful profiles. Existing technology applications do not centrally store the data and interpret it in context to provide a useful service to society.

SUMMARY OF INVENTION

The present invention teaches the uploading, evaluation and storing of recorded date and time stamped operating data ("time marked data") from a motor vehicle component and the subsequent upload to a CPU or central web-server for objective analysis. The data may also be location marked and thereby allow the vehicle data to be correlated with separate time or location specific databases. The recording of the data to a separate device can in such a manner as to insure a complete dataset, minimize fraudulent use, and thus insure the accuracy and usefulness of said data to third parties. Utilization of the data may be subject to terms of agreements among the vehicle operator, the vehicle owner, insurance companies and underwriters (health, life or auto, etc.), research professionals, marketing and advertising firms, legal representatives, governmental authorities or other institutions.

Since the data may be time marked with an accurate atomic clock signal, the data can be cross correlated to other information database that is also time or location specific. This data could include weather events, construction schedules, sporting events, traffic databases, and other time or location dependent information that puts the driver operating data in context and makes it objectively useful. The data manipulation-analysis includes assessing the driver's driving behavior by putting the data in context with the applicable local speed laws, signage, traffic signals, weather, and other geographic dependencies.

The invention can utilize publicly a variety of currently monitored vehicle information from vehicle systems such as an OBDII (on-board diagnostic) or CAN (car area network) data-port. This time marked data may include vehicle speed, throttle position, oxygen sensor data, etc. This information is sequentially recorded at regular intervals from vehicle onboard diagnostic systems, thereby creating a time marked data set of individual data points. The data set of time marked sequential data points may include the vehicle's corresponding GPS (global positioning satellite) position.

The basic intent of the new application is to insure data integrity. Having multiple sources of vehicle data will insure data accuracy. For example, speed can either be inferred from the GPS position and time stamped data by calculating the distance between recorded locations and dividing by the time increment, or by accessing speed values directly from the OBDII port. Similarly, the vehicle's odometer reading can be gathered three different ways: first, it can be accessed through the OBDII extended dataset if the car manufacturer grants permission, secondly, it can be calculated from the GPS location and time stamped data, third it can be calculated from the speed data logged directly from the OBDII port, then multiplied by the time increment to get distance. Having multiple sources of data insures data integrity by crosschecking. Time and location stamping the data allows for crosschecking against other information databases such as weather, traffic, etc.

This collected data is transferred to a CPU and may be uploaded to a central web-server for evaluation and storage. The invention utilizes data obtained from individual vehicle monitoring and instrumentation devices already built into motor vehicles since 1996. The invention can also utilize information from supplemental instrumentation such as GPS devices installed on motor vehicles.

The invention teaches transfer of the time marked information from the collection system within the vehicle to a separate CPU and the flexible, multi stage evaluation of the collected data for variable factors or criteria. The invention permits a weighted profile to be created that can be correlate both frequency and severity or significance of behavior. This weighted profile is useful because the data integrity has been insured by multiple sources.

The invention also teaches a business subscription service that can be used in conjunction with the recording/analysis apparatus. The method allows analytic comparison within groups using collected data from separate units. This analysis can allow assessment and comparison of a variety of life style/health factors. The analysis, based upon historical and accurate data, can be used in conjunction with other demographically relevant information.

BRIEF SUMMARY OF DRAWINGS

The accompanying drawings, which are incorporated in and constitute a part of the specification, illustrate preferred embodiments of the invention. These drawings, together with the general description of the invention given above and the detailed description of the preferred embodiments given below, serve to explain the principles of the invention.

FIGS. 19A, 19B, 19C and 19D comprise a table of actual recorded time marked speed data an assessed violation/penalty utilizing an embodiment of he invention.

FIG. 23 illustrates the screen display allowing the user to view various driving events of the selected driver that are within the invention database and for which a Driver Safety Rating has been computed.

FIG. 25 illustrates the screen display of evaluated trip data derived from the matrix of time and location marked data.

FIG. 27 is a representation of the display screen of the invention showing the streets traveled during a selected driving event as well as the time and speed limit.

Figure 1:
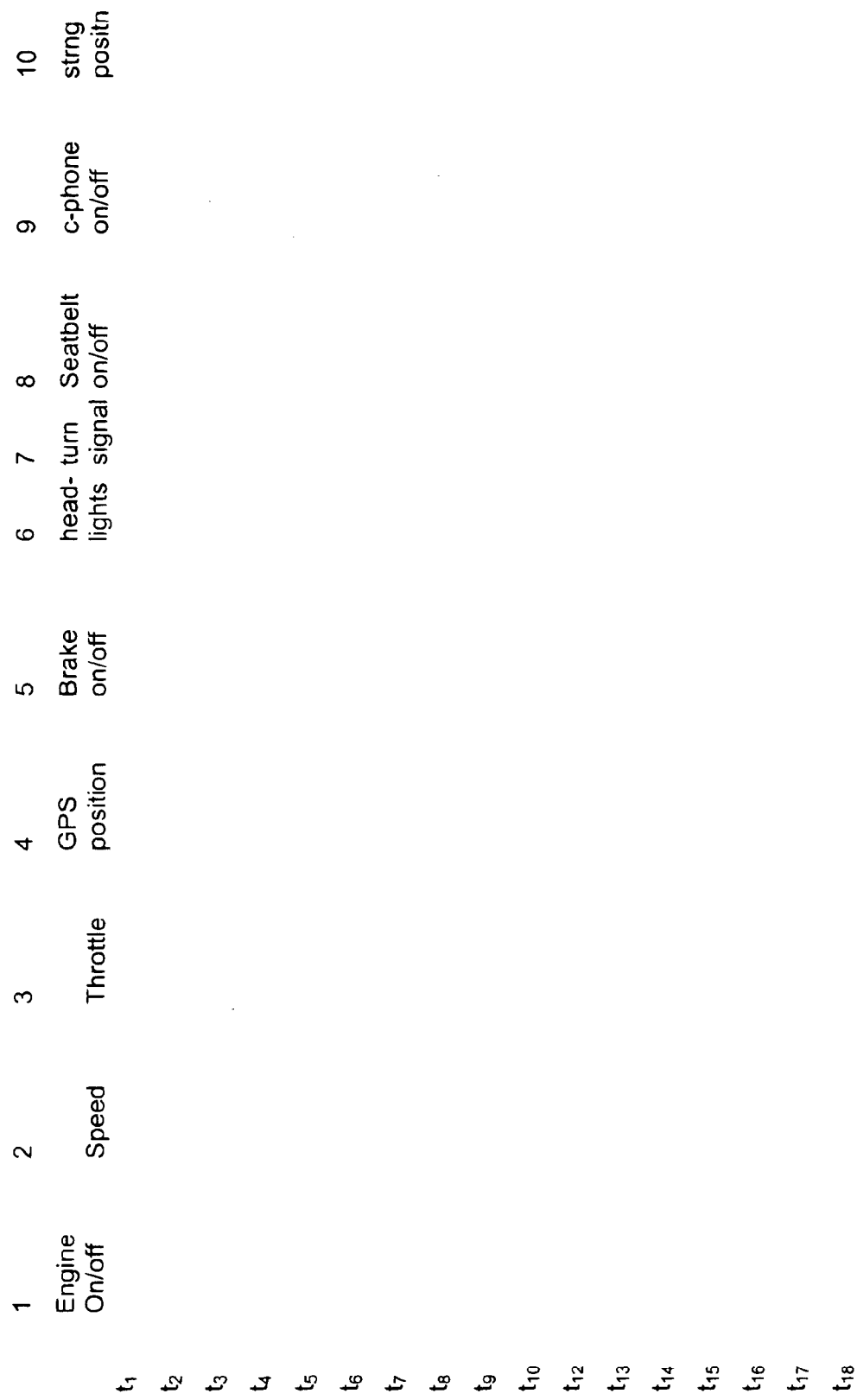
FIG. 1 illustrates a matrix of time marked vehicle data that can be evaluated by the invention.

It will be appreciated that the foregoing drawings illustrate only one embodiment of the invention and that numerous other variations may be created within the scope of the described invention.

DETAILED DESCRIPTION OF INVENTION

The above general description and the following detailed description are merely illustrative of the subject invention and additional modes, advantages and particulars of this invention will be readily suggested to those skilled in the art without departing from the spirit and scope of the invention.

The invention comprises multiple steps, beginning with the collection of data at regular time intervals, preferably at least as frequently as approximately every two seconds. The data includes the publicly available operational data from the OBDII port such as speed and engine throttle position or other variable power controls of the vehicle power source. It may also include so called "extended OBDII" datasets that are specific to each manufacturer and also available with manufacturer permission such as odometer, seat belt status, activation of brakes, degree and duration of steering direction, etc., and implementation of accident avoidance devices such as turning signals, headlights, seatbelts, activation of automated braking systems (ABS), etc. The position and movement of the vehicle can also be collected utilizing a GPS system. Other information regarding the operation of the vehicle can be collected since the extended OBDII set includes a whole host of engine or other power source diagnostic variables. Further the invention applies to other data systems being developed and implement. An example is the CAN (car area network).

One embodiment of the invention utilizes data points of various systems and operations collected at substantially simultaneous intervals, thereby creating sequential "data points" containing information from multiple sources pertaining to vehicle operation and movement. The data points are recorded at regular intervals. These intervals can be of varied duration. For purpose of illustration of the invention herein, the intervals are specified to be every two seconds.

The data can be recorded or transferred to various removable electronic storage devices, including but not limited to flash memory cards now utilized for digital cameras, etc. Utilizing such portable storage media, the data can be transferred to another electronic data reading device such as a CPU or CPU linked to an Internet server. The data can be then transferred, stored, manipulated and analyzed ("evaluated") as desired to provide information concerning not only the location and duration of vehicle operation, but also the manner in which the vehicle was operated. For situations where multiple drivers utilize multiple vehicles, each vehicle can be equipped with a non-removable memory to record all its operation, regardless of which driver utilizes the vehicle. This data can then be reconciled with the data downloaded by the driver through his or her personal flash memory card. Gaps in the data can then be investigated by an employer, parent, owner of a rental vehicle, or otherwise responsible party.

Figure 2:
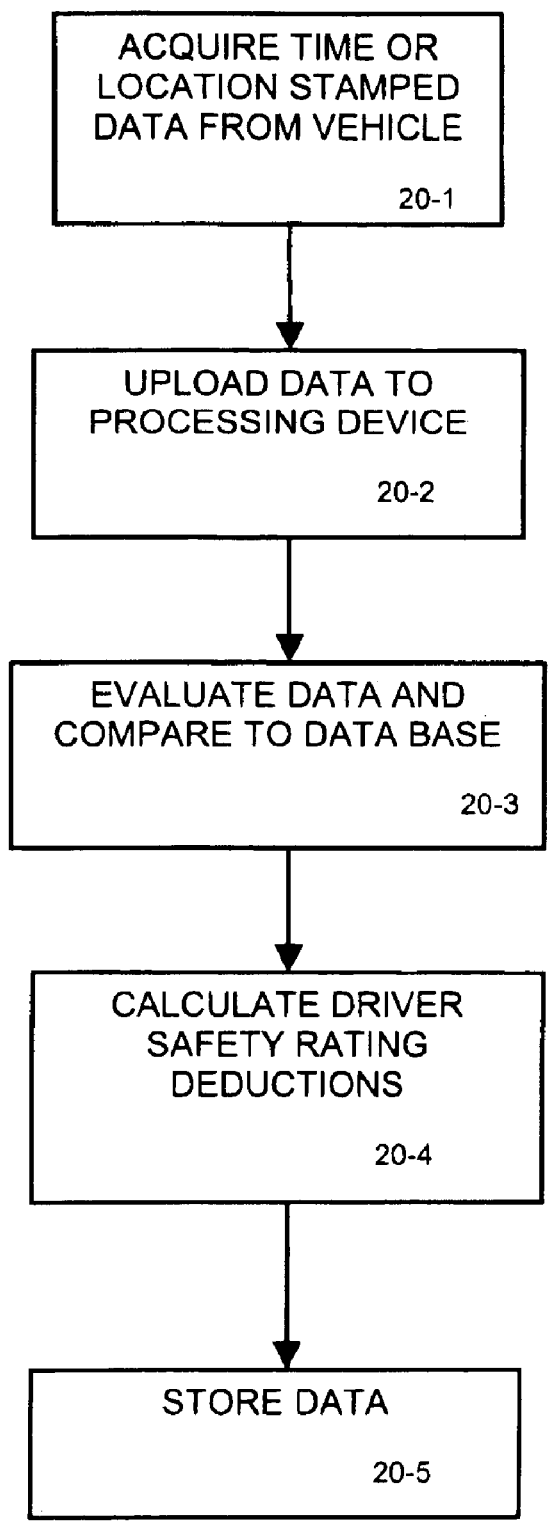
FIG. 2 illustrates an overview or summary of logic steps of one embodiment of the invention.

FIG. 1 illustrates one embodiment of the type and variety of information that may be recorded and uploaded for evaluation by the invention. The captured information illustrated in FIG. 1 are "Engin on/off" 1, "speed" 2, "throttle" 3, "GPS position" 4, "brake on/off" 5, "headlights" on/off 6, "turn signals" on/off and direction 7, "seatbelt on/off" 8, "c-phone on/off" 9, and "sting positn" (steering wheel position) 10. The invention captures information for each category for each time interval ($t_1$, $t_2$, etc.). The collected data is thereby time marked or time stamped. The data may be evaluated for selected and variable criteria. As illustrated in FIG. 2, time marked data of the variety shown in FIG. 1, can be acquired 20-1 and uploaded 20-2 into the variable evaluative 20-3 algorithm of the invention. The algorithm may be used to objectively rate 20-4 the data for selected factors of driver safety. Note that not all recorded data is required to be evaluated and the stored data 20-5 can be re-evaluated for differing criteria and factors. Therefore, a data base may be created for identifiable and separable individuals. The data base may track driving and other behavior habits over time.

The operational information may be identifiable to specific operator(s) and include time stamped data and geographic location. Operator identity can be one of many additional data inputs for each time interval recording in FIG. 1. Further, comparison of recorded speeds at differing data points can provide information regarding vehicle acceleration or de-acceleration (rate of acceleration). As indicated, these calculations can be inferred from GPS, or measured directly from the OBDII port to insure data integrity. Multiple data sources can be used for comparison or validation of individual recorded data. For example, see FIG. 9 discussed infra. Correlation of vehicle speed with vehicle directional information can also be compared to GPS data of the vehicle travel. The ability to analyze and compare various data sources can provide enhanced data accuracy and validity. The multiple data sources also provide continuity of information when individual data sources may be interrupted, such as temporary interruption of a GPS signal. This continuous monitoring is vital to create objective driver safety ratings that include a complete set of the vehicle's operating data.

Figure 3:
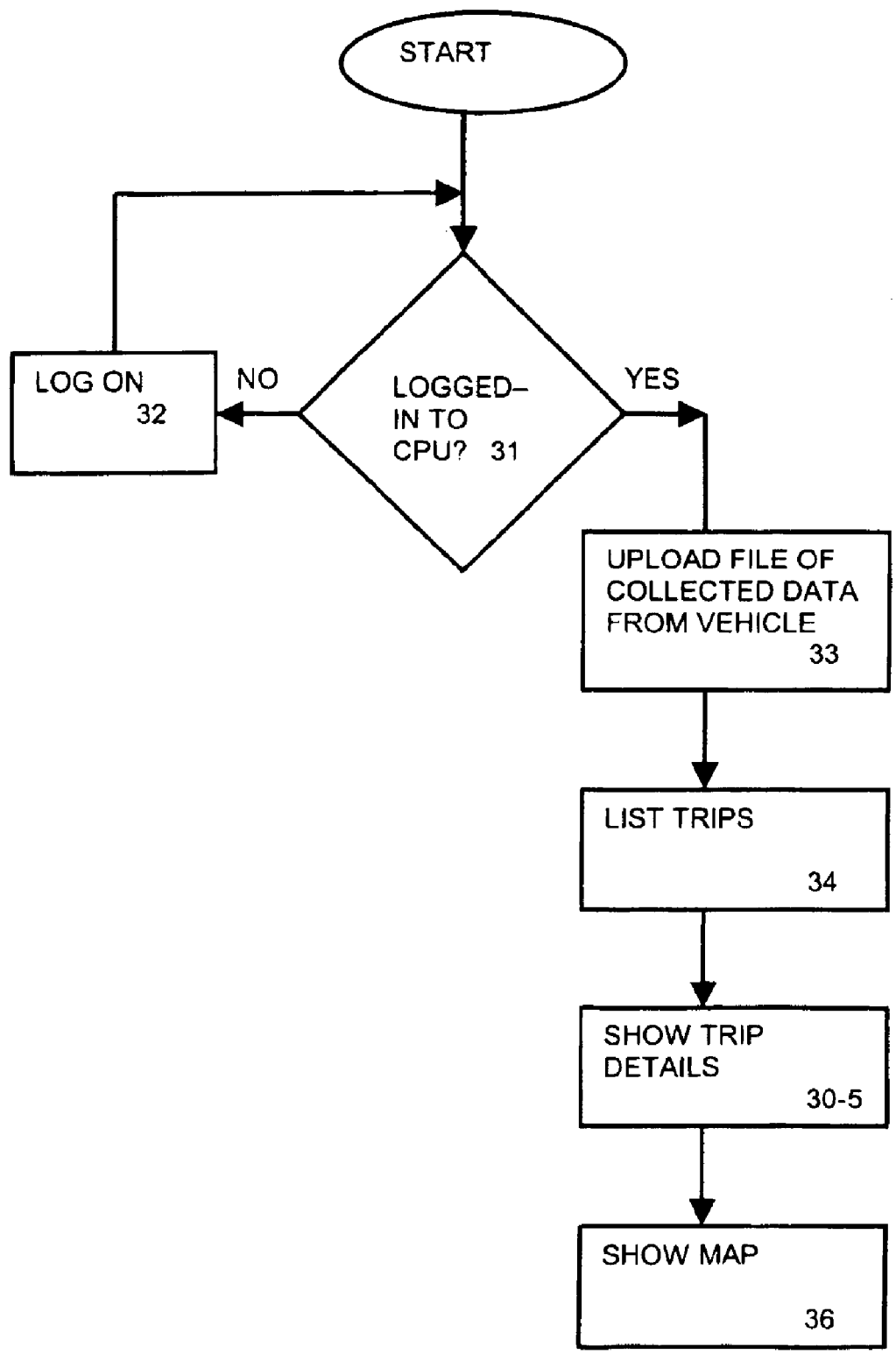
FIG. 3 illustrates starting steps of an embodiment of logic flow steps that can be incorporated into the evaluation method of the present invention.

FIG. 3 illustrates starting steps of an embodiment of logic flow steps that can be incorporated into the evaluation method of the present invention. These steps are implemented after the vehicle operation data has been collected. The system first queries whether the user is logged on or connected to a CPU 31. If not logged on, the user is prompted to log on 32. If logged on, the system uploads files of collected data from the vehicle 33. The system may first process and list the trips recorded in the uploaded collected data 34. The system can display the trip details 30-5, including trip map 36.

Figure 4:
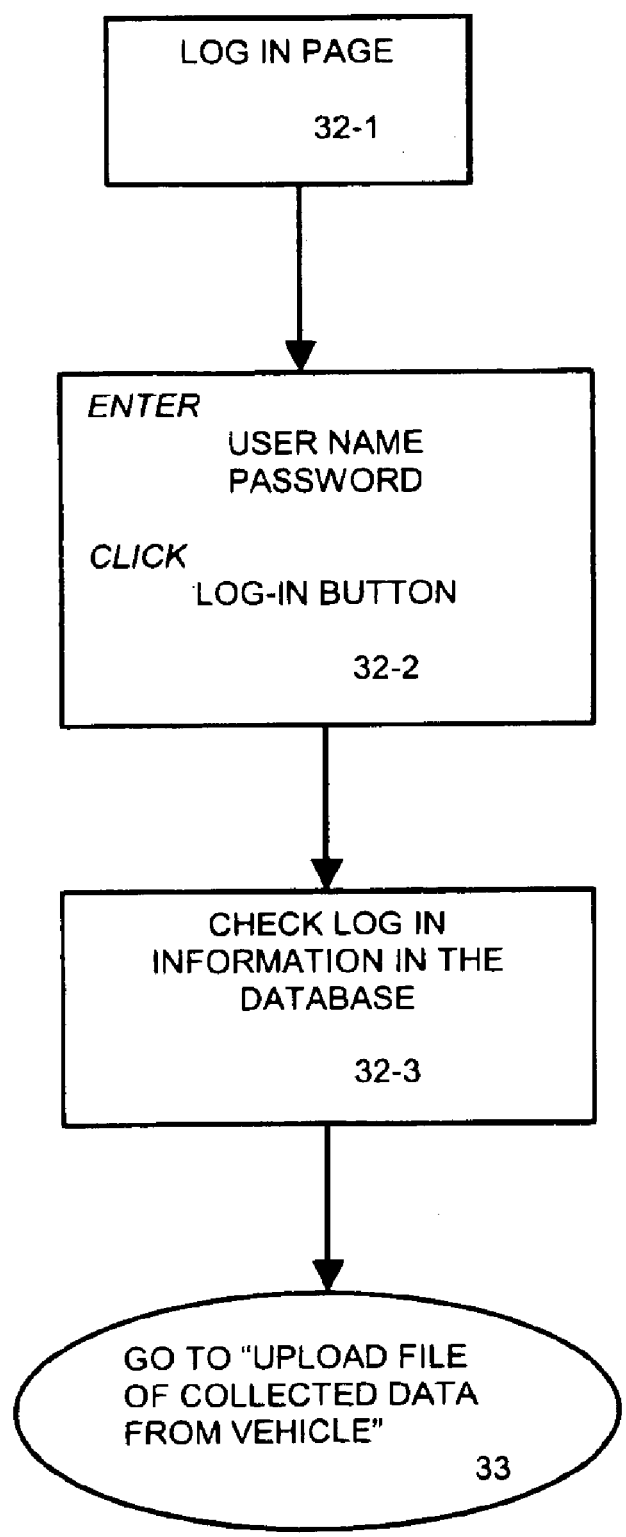
FIG. 4 illustrates an embodiment of logic steps that may be taken by the user for properly logging into the system taught by the invention.
Figure 21:
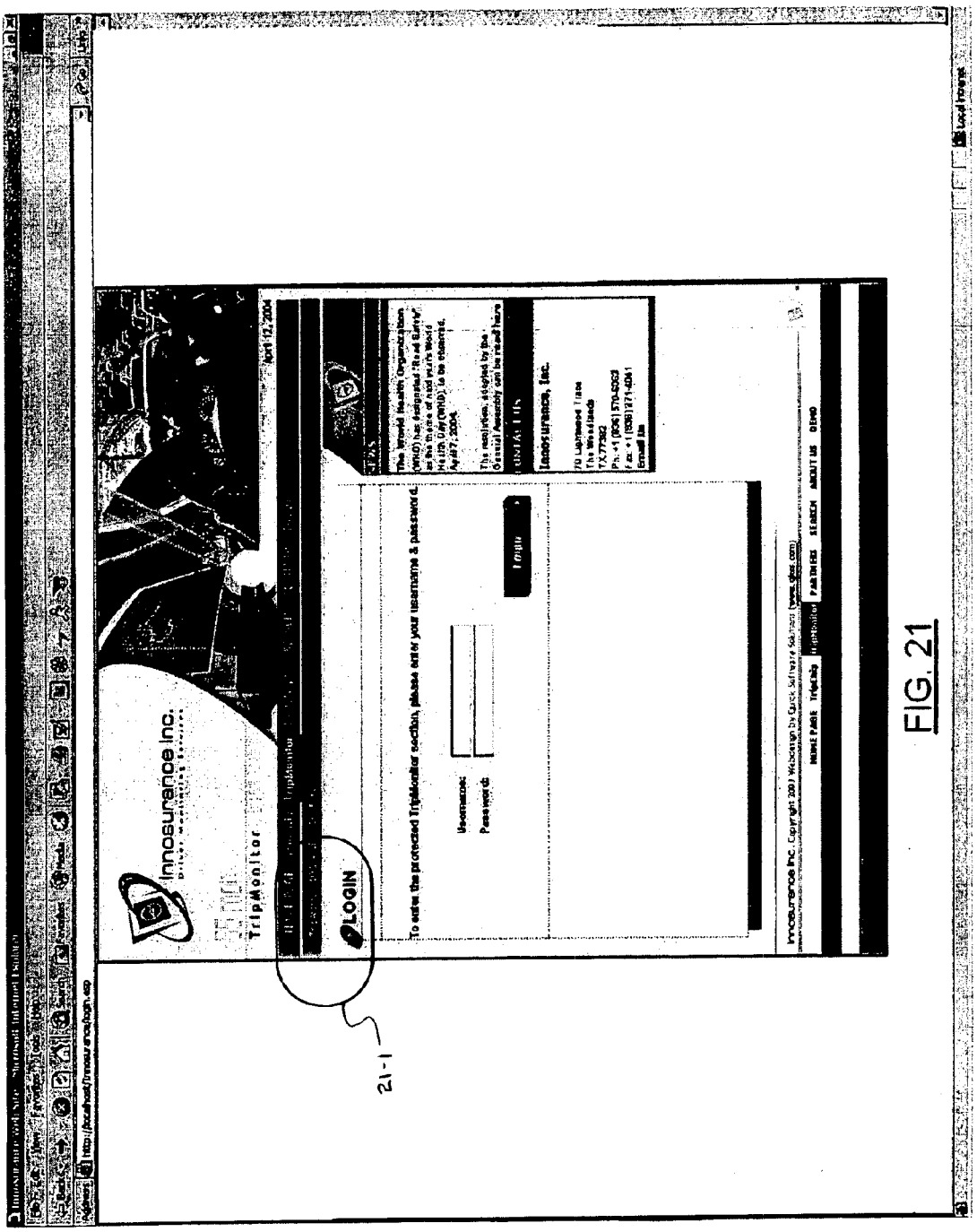
FIG. 21 illustrates the log in page displayed to a user of an embodiment of the invention.

FIG. 4 illustrates an embodiment of logic steps that may be taken by the user for properly logging into the system taught by the invention. Properly logging into the system begins at the log in page 32-1. An example of a log in page is illustrated in FIG. 21 .The user can be prompted to enter the user and password and then to click on the "Log-in button" 32-2. The system then checks the log in information in the database to validate the user. After being validated, the user can be directed to the "Upload File of Collected data from vehicle" 33. (See FIGS. 3, 21 and 22.)

Figure 5:
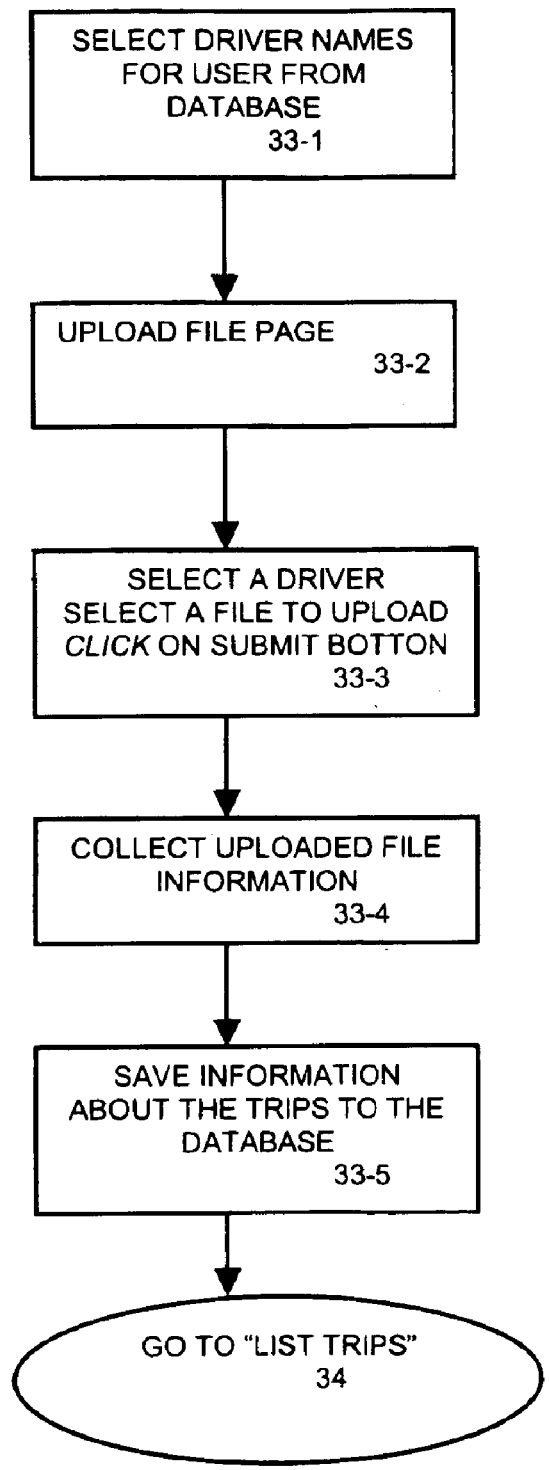
FIG. 5 illustrates logic steps utilized in one embodiment of the invention that are taken in uploading information.

FIG. 5 illustrates logic steps utilized in one embodiment of the invention that are taken in uploading information. The user can select the driver of interest from the driver names contained in the database 33-1. The file page for the selected driver(s) is then displayed 33-2 and the user can be prompted to unload the information pertaining to the selected driver into the system. See for example FIG. 23. illustrating a screen display that allows the user to view various driving events of the selected driver that are within the invention database. The information can then be collected and uploaded 33-4. The system can then save the information about the trips to the database 33-5. The user can then be directed to the list trips screen (See FIG. 3)

Figure 6:
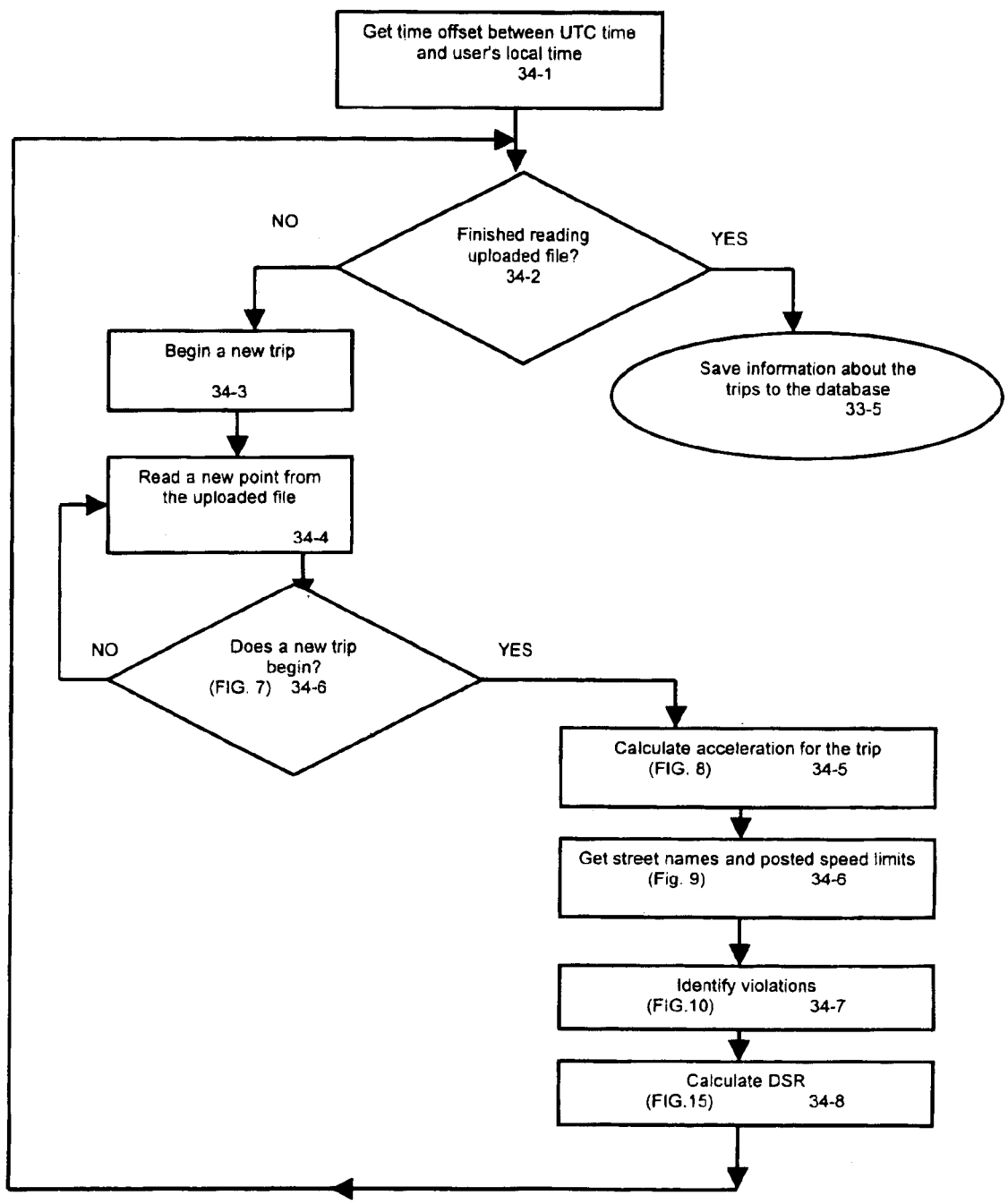
FIG. 6 illustrates the logic steps utilized in one existing embodiment of the invention for reading and commencing revaluation of uploaded files.

FIG. 6 illustrates the logic steps utilized in one existing embodiment of the invention for reading and commencing revaluation of uploaded files. The logic may first provide reconciliation between the local time zone and the UTC time 34-1. The logic sequence then can query whether the system has finished reading the uploaded file 34-2. If the user's session is not completed, the reading of a new trip can begin. The reading commences at a new point on the uploaded file 34-4. The logic sequence queries whether the unloaded file indicates that a new trip has begun 34-6. (See FIG. 7.) If a new trip has not begun, the logic sequence continues reading at a new point on the uploaded file and thereby continuing the review of the trip file. If the uploaded data indicates a new trip has commenced, logic sequence then evaluates the trip. Evaluation can include for example, calculating the acceleration for the trip 34-5, obtaining the street names and posted speed limits 34-7, identification of violations (e.g., excess speed and acceleration/de-acceleration) 34-8 and calculation of a DSR rating 34-9. After completing the trip DSR, the system returns to the uploaded file 34-2. If there are no unread files, the information, including calculations, is stored in the database 33-5. Note the calculations and information storage occurs apart or separate from the data collection components located in the vehicle.

Figure 7:
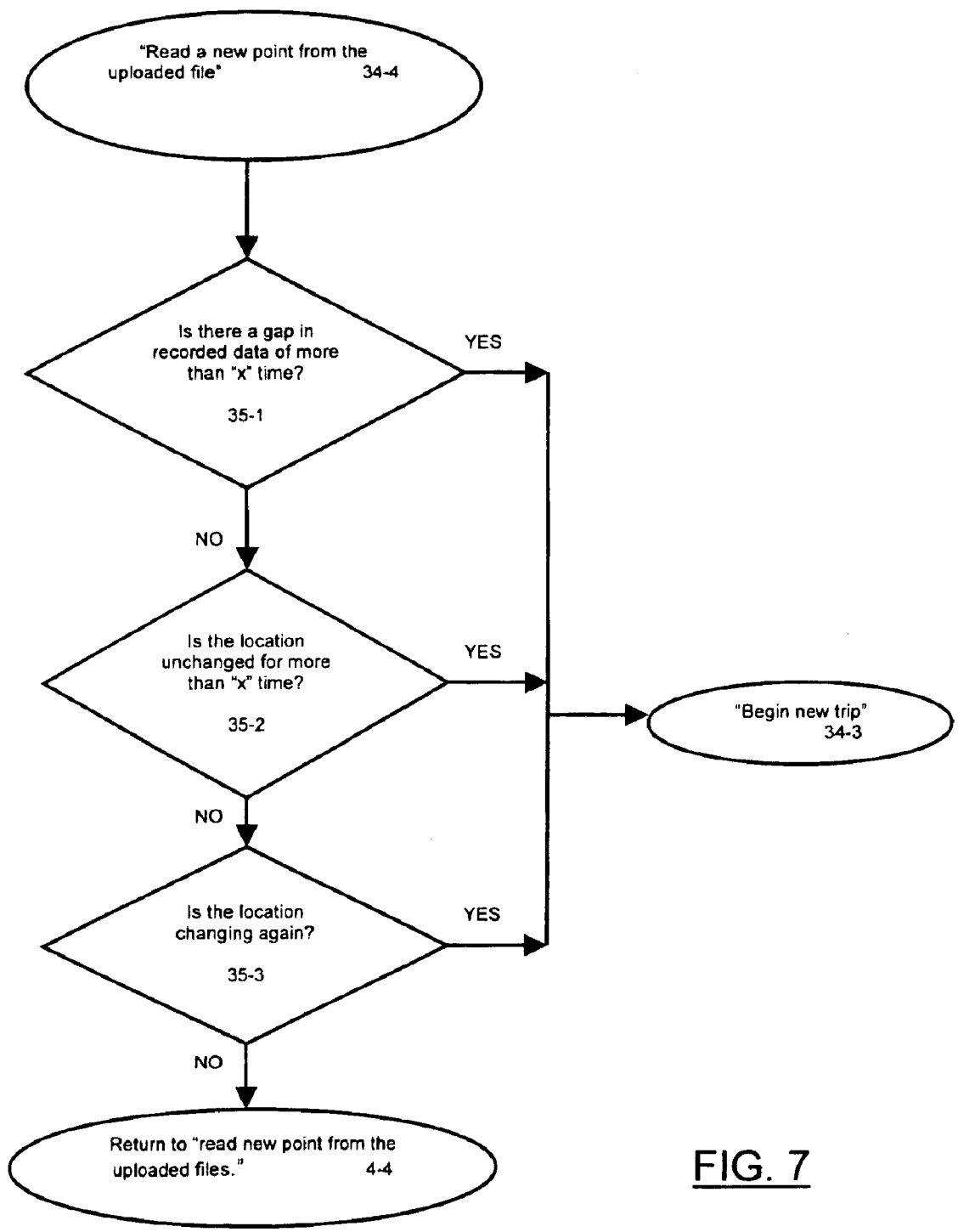
FIG. 7 illustrates logic steps incorporated into one embodiment of the invention wherein uploaded recorded information may signal the end of one driving event and the start of a separate trip.

FIG. 7 illustrates logic steps incorporated into one embodiment of the invention wherein uploaded recorded information may signal the end of one driving event and the start of a separate trip. The sequence illustrates one embodiment of the logic steps determining whether a new trip begins. (See FIG. 6, item 34-6.) The system queries 35-1 whether there is more than a minimum time gap in the recorded data. If yes, the logic program classifies the new information to be Dart of a separate "new trip" 34-3. If there is no gap in recorded data, the system Queries whether there has been a change in vehicle location 35-2. If there is no minimum gap of OBDII data but the GPS location data is unchanged for more than the minimum time 34-2 & 34-3, the new GPS data begins a new trip. (For example, if the car is parked for more than the minimum time, e.g. 15 minutes, with the engine idling, resumed movement of the vehicle after the 16 minute of engine idling, i.e. the vehicle engine continuously operating, would start a new trip.) Until there is more than a minimum time gap is engine (OBDII) data or change in vehicle position, a new trip is not deemed to start and the logic continues to read the data as new data of a continuing trip 34-4.

Figure 8:
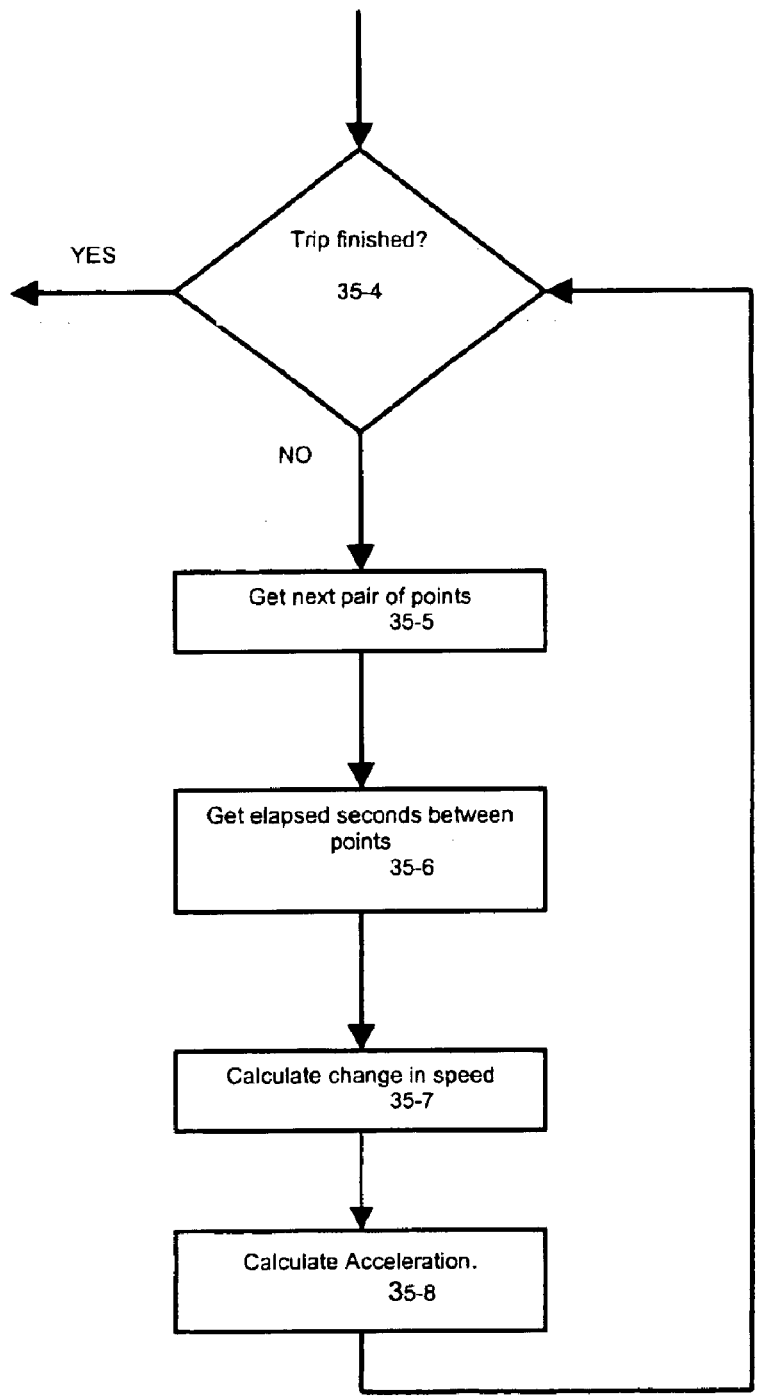
FIG. 8 illustrates logic steps utilized to achieve continued calculation of vehicle acceleration from uploaded time marked speed data for a single trip.

FIG. 8 illustrates logic steps utilized to achieve continued calculation of vehicle acceleration from uploaded time marked speed data for a single trip. As the trip continues 35-4, the next speed data point creates a new pair of data points. i.e. the prior data point and the current new speed data point 35-5. The logic program calculates the amount of time 35-6 and the change in speed between the two speed data points 35-7. The change is speed per unit of time is the vehicle acceleration 35-8.

Figure 9:
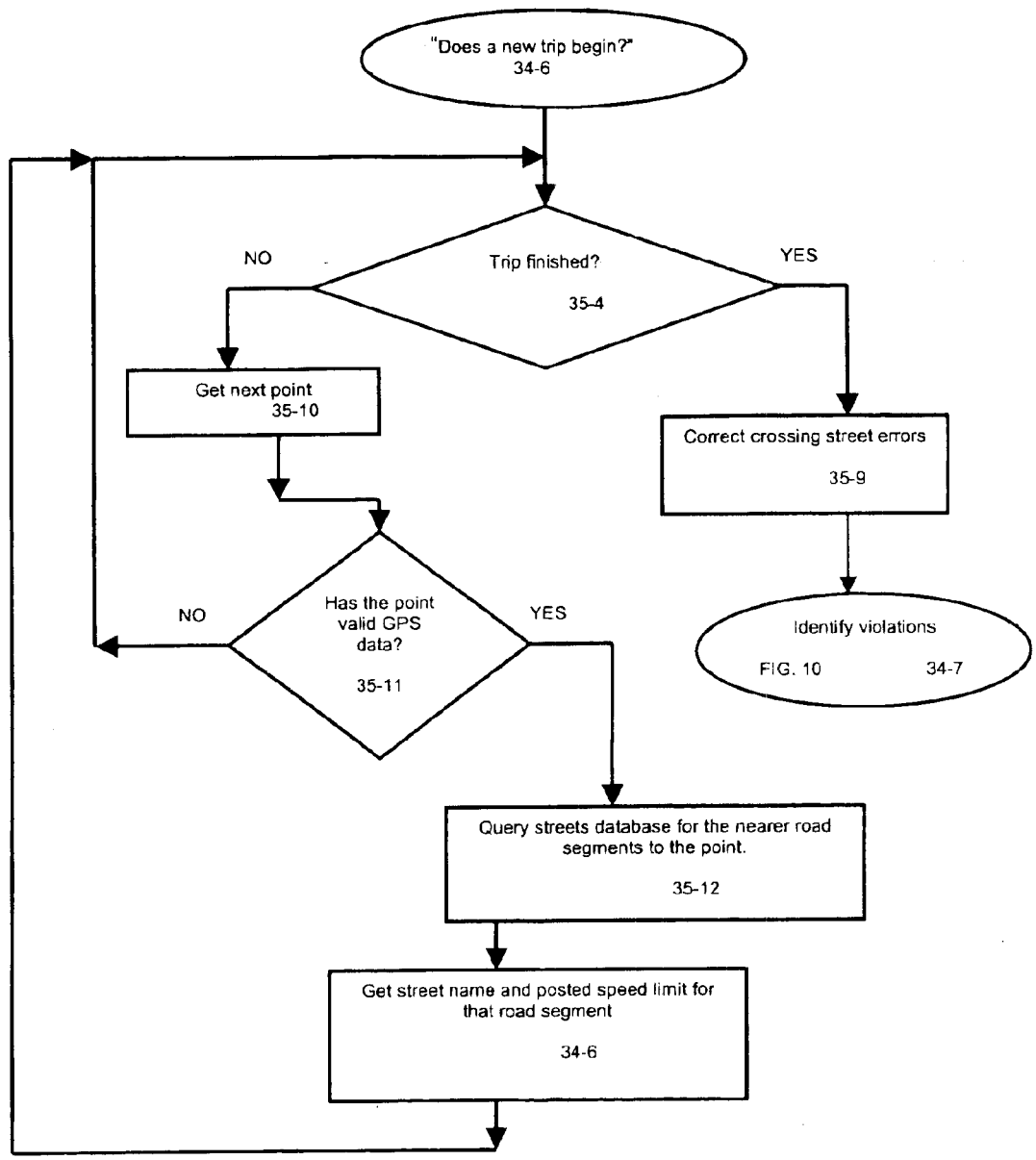
FIG. 9 illustrates the logic steps utilized to by an embodiment of the invention to continuously evaluate recorded GPS time marked trip data and correlate data to separate a separate data base containing street and speed limit information.

FIG. 9 illustrates the logic steps utilized by an embodiment of the invention to continuously evaluate recorded GPS time marked trip data and correlate data to separate a separate database containing street and speed limit information. The logic Program continues from the FIGS. 6 and 7 (see item 34-6 in FIG. 6). If the trip is not finished 35-4, the next data point is evaluated whether it contains a valid GPS data 35-11. If yes, the logic system accesses a separate database containing road or street information. After determining the nearer road segment 35-12, the street name and posted speed limit for that identified road segment is obtained from the database 34-6. The logic system again determines whether trip has been finished 35-4 and if yes, correction is made for crossing street error 35-9. For example if data point $t_1$ is determined to be nearest Jones Street with speed limit 45 mph and data point $t_2$ is determined to be the intersection of Jones and Smith Streets where Smith Street has a speed limit of 35 mph and at data point $t_3$ is determined to be at Jones Street with the continued speed limit of 45 mph, no speed violation will be identified 34-7. (Reference is also made to the collection of data points in FIG. 1.)

Figure 10:
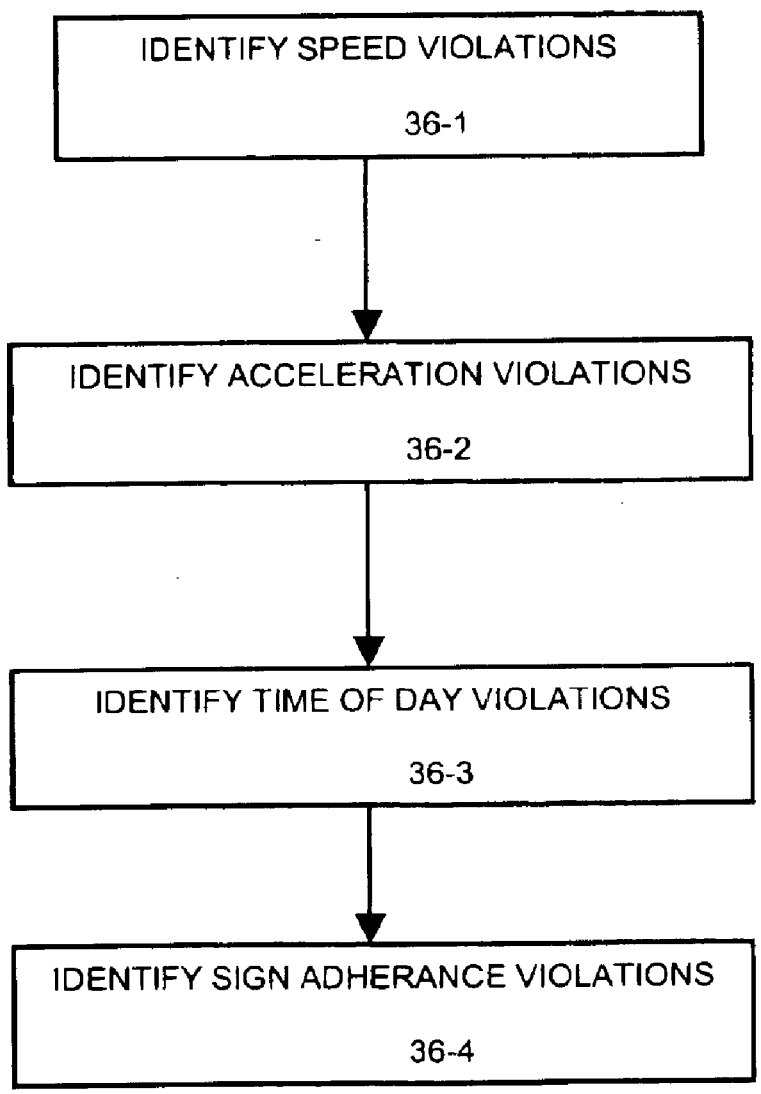
FIG. 10 illustrates the sequential relationship of data evaluation for speed, acceleration, etc. infractions.

FIG. 10 illustrates the sequential separate relationship of data evaluation for speed, acceleration, etc., infractions, The sequence illustrates the evaluation of uploaded data for speed violations 36-1, acceleration violations 36-2, time of day violations 36-3 (i.e., "deductions" to the DSR for driving at night or high risk weekend time segment), and sign adherence violations 36-4. It will be appreciated that the sequence is illustrative only and may be abridged, supplemented or reordered.

Figure 11:
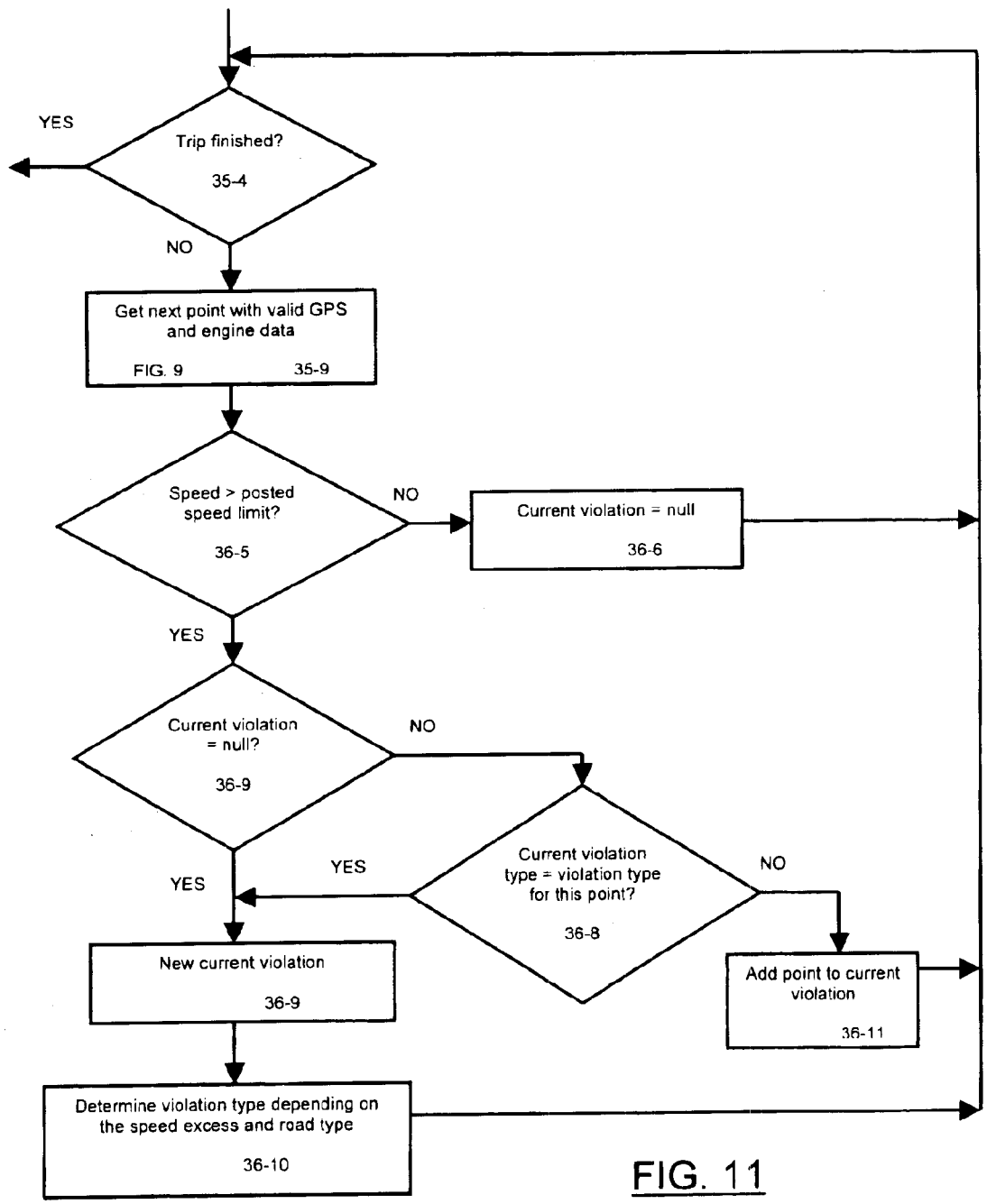
FIG. 11 illustrates the detailed logic steps for determining a speed violation from each time marked data point of vehicle speed with the matrix of recorded information and the assessment of penalty point for the Driver Safety Rating.

FIG. 11 illustrates the detailed logic steps for determining a speed violation from each time marked data point of vehicle speed with the matrix of recorded information and the assessment of penalty point for the Driver Safety Rating. The logic program evaluates the uploaded data to determine ascertains whether the trip is finished 35-4. If not, the logic program obtains the next point having a valid GPS and engine data 35-9. (Reference is made to FIG. 9, items 35-4, 35-10, 35-11.) The logic program next queries whether the vehicle speed exceeds the posted limit 36-5. If the posted speed limit is not exceeded, there is no current violation 36-6. If the speed exceeds the costed limit 36-5, the logic program queries 36-8 whether the vehicle is operating in concurrent violation, e.g., high-risk driving time violation, acceleration violation, etc. as listed in Figure 10. If the concurrent violation is of the same type 36-9 i.e., speed violation, the vehicle will be deemed to be operating in a continuing speed violation and DSR point deduction increased 36-10. If not of the same type 36-11, a separate DSR deduction will be calculated. The logic program then again queries whether the trip is finished 35-4.

Figure 12:
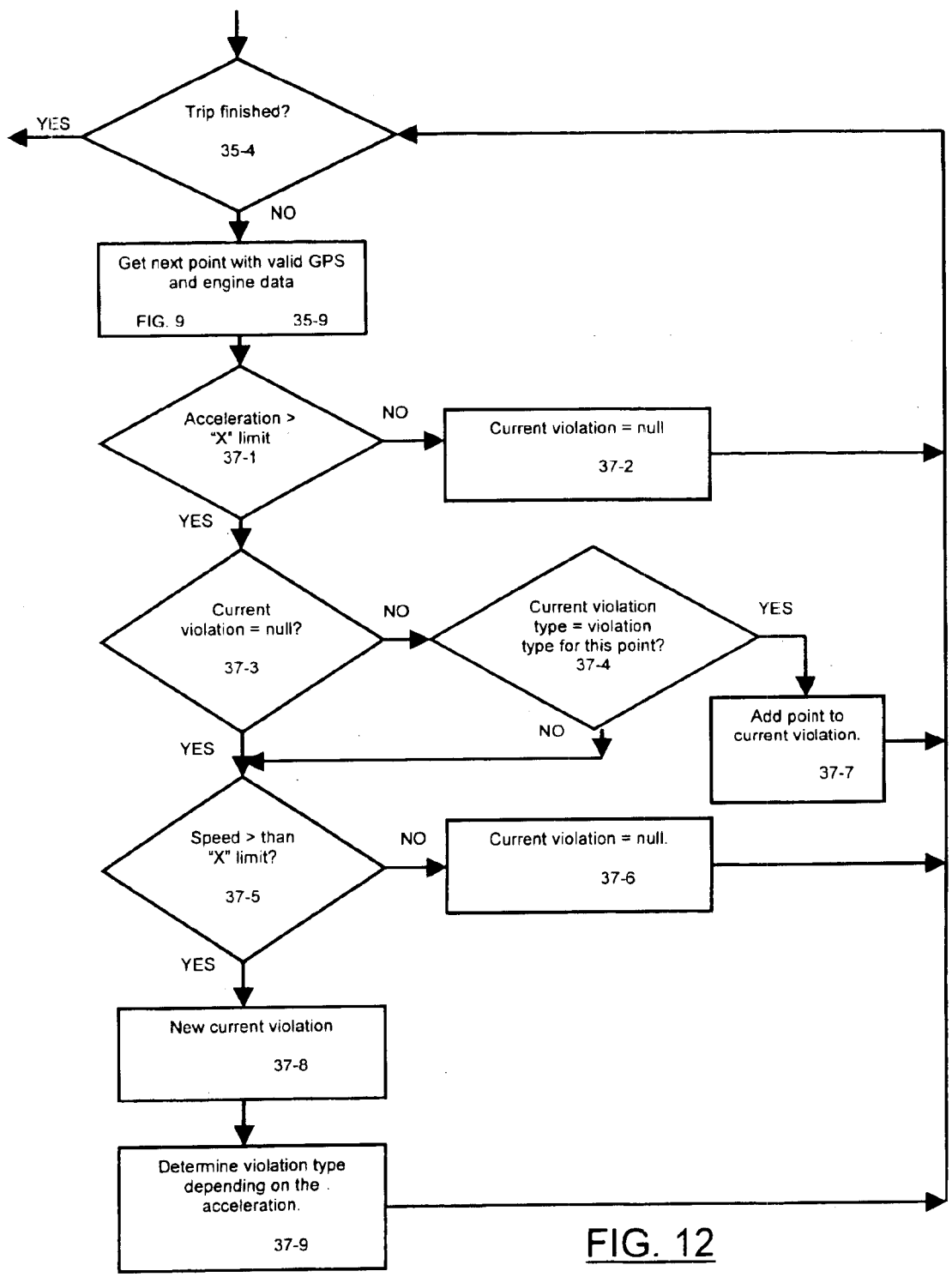
FIG. 12 illustrates the detailed logic steps for continuous evaluation of compute vehicle acceleration and assessment of penalty point for the Driver Safety Rating.

FIG. 12 illustrates the detailed logic steps for continuous evaluation of vehicle acceleration and assessment of penalty point(s) to the Driver Safety Rating. This logic step, which is separate from the speed violation step (reference to FIGS. 10 and 11) starts at the same point 35-4 and 35-9 (reference again to FIG. 9). The vehicle acceleration is separately calculated as illustrated, for example, in FIG. 8 discussed above. Continuing with FIG. 12, the logic program queries 37-1 whether the acceleration exceeds a specified limit. If no, there is a determination 37-2 of no current excess acceleration violation and the logic program returns to the beginning step 35-4. If the specified "x-limit" rate of acceleration 37-1 is being exceeded, the logic program queries 37-3 whether there is a concurrent violation. If there is a concurrent violation, the logic program 37-4 queries whether the violation is of the same type (e.g., continued acceleration in excess of the specified limit) and if yes, the DSR deduction is increased 37-7. If the is no concurrent violation, the logic program continues 37-5 and queries whether the vehicle speed is in excess of a specified limit. (It will be appreciated that a vehicle has a relatively high rate of acceleration in the first moment of movement from a stopped position, but simultaneously has a relatively slow speed.) If the speed is not in excess of the specific "x" limits, there is no violation (current violation=null) 37-6. If the vehicle speed exceeds the specified limit 37-8 (which may differ from the posted speed limit for the road segment as determined with reference to FIGS. 9 and 11), a new concurrent violation is assessed. The new current violation type is then determined 37-9 depending upon the acceleration. The logic program then repeats and returns 35-4 to the query of whether the trip is finished.

Figure 13:
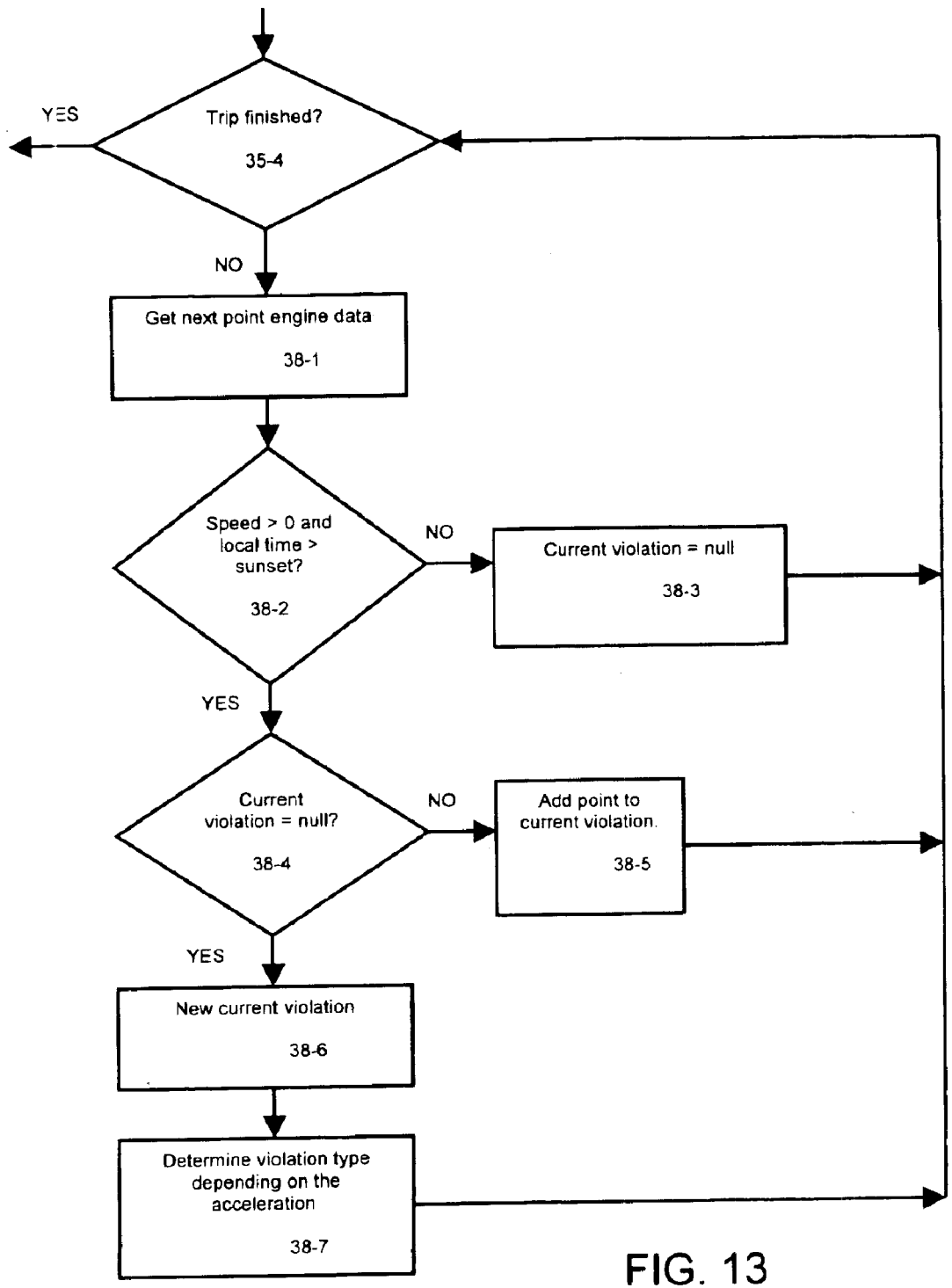
FIG. 13 illustrates the detailed logic steps for evaluation of a "time of day violation" in recognition that driving after sunset is inherently less safe than driving in daylight.

FIG. 13 illustrates the detailed logic steps for evaluation of a "time of day violation" in recognition that driving after sunset is inherently less safe than driving in daylight. The logic program first ascertains whether the trip is finished 35-4. If not, the, the logic program obtains the next point and engine data 38-1. The logic program next queries if the speed is greater than 0 and local time is greater than "after sunset" 38-2. If no, there is no violation 38-3 and the logic program returns to the beginning 35-4. Alternatively, if the speed is greater than 0 and the local time is after sunset, the logic system next queries if there is a current violation 38-4. If there is a concurrent violation (current violation not equaling null), there is an automatic increase 38-5 to the concurrent violation deduction from the Driver Safety Rating. If there is no concurrent violation 38-4, a new violation is assessed for the time of day violation 38-6 and the type, i.e., severity, of violation is in this example illustrated to be determined by the acceleration 38-7 of the vehicle. As an example, if the vehicle is speeding (current violation not equaling null), there is an automatic surcharge 38-5 to the driver safety rating. If there is no current violation, there is a new violation assessed, but the if the vehicle is slowing down or at a constant speed (acceleration equal or less than 0) the driver safety rating penalty may be less than if the vehicle is accelerating.

Figure 14:
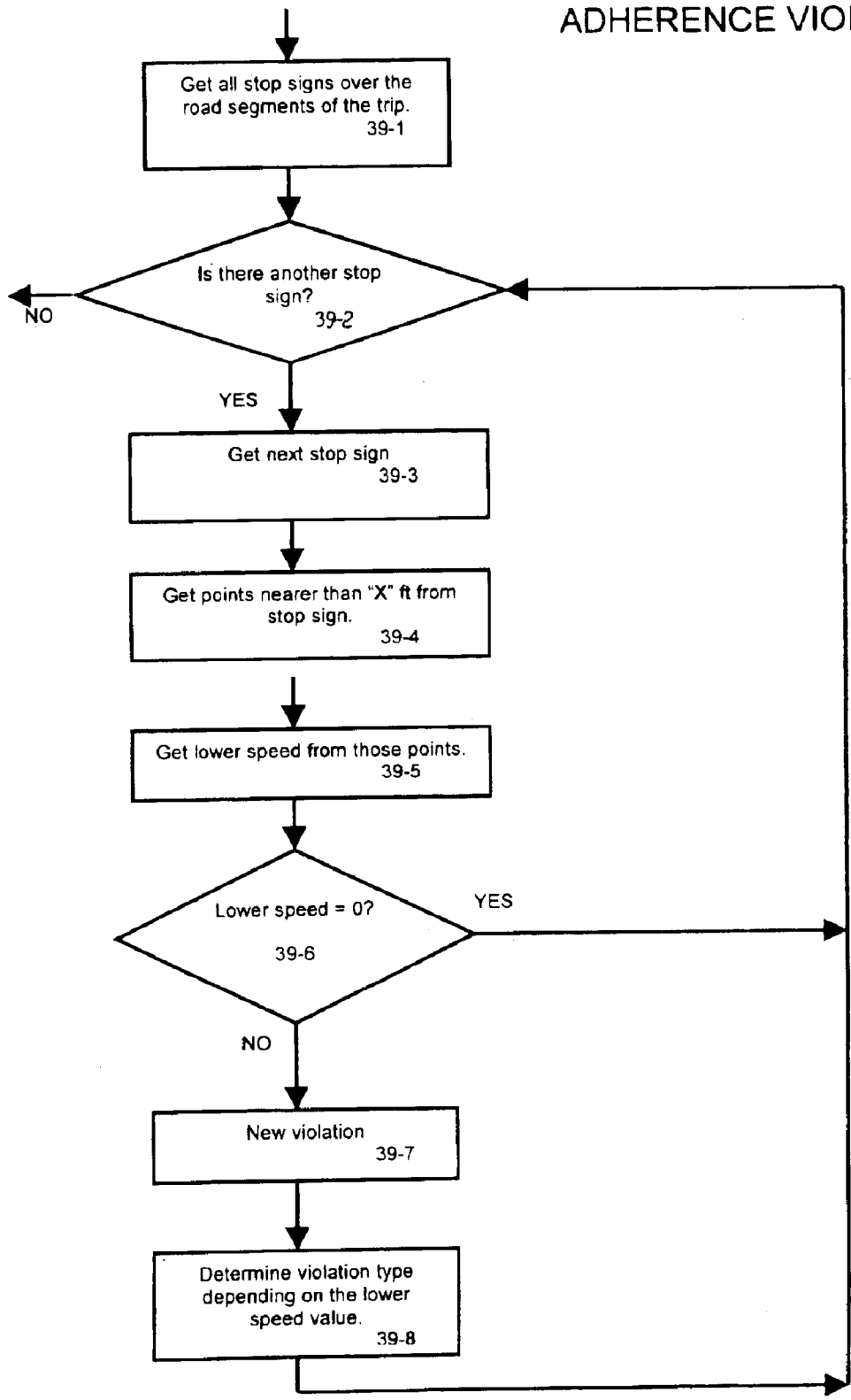
FIG. 14 illustrates the logic steps for continued evaluation of the time marked GPS and vehicle speed data in correlation with a separate data base containing road sign information to verify, for example, that the vehicle has been operated in compliance with a stop sign.

FIG. 14 illustrates the logic steps for continued evaluation of the time marked GPS and vehicle speed data in correlation with a separate data base containing road sign information to verify, for example, that the vehicle has been operated in compliance with a stop sign. In this example, the logic system determines the route of the vehicle taken during the trip 39-1 and all stop signs located on a separate database correlated with the GPS information are identified. The operation (OBD-II) data for the vehicle is then correlated with the stop sign locations 39-2. If there is a stop sign 39-3 the logic program looks at vehicle operation within a specified distance before the stop sign 39-4 and particularly the vehicle speed 39-6. If the lowered speed is 0, the logic program determines the vehicle stopped in compliance to the stop sign and there is no violation. If the vehicle speed does not slow to 0 at any location "nearer than 'X' ft from stop sign", the logic program assesses a violation 39-7 based upon failure to stop in compliance with the sign. The violation type, i.e. severity, is determined depending on the lower speed value 39-8. For example the penalty to the driver safety rating will be less if the logic programs determines a "rolling stop" in contrast to the vehicle never slowing below 30 mph, i.e., "running a stop sign". The logic program then returns to the point 39-2 for determining if there is another stop sign.

Figure 15:
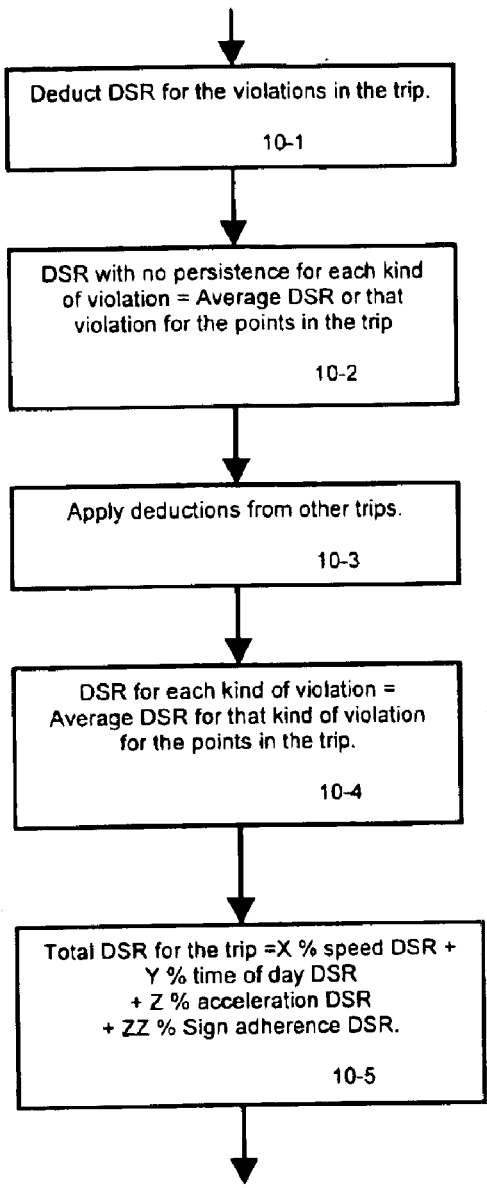
FIG. 15 illustrates the logic steps of an embodiment of the invention wherein the Driver Safety Rating (DSR) is calculated.

FIG. 15 illustrates the logic steps of an embodiment of the invention wherein the Driver Safety Rating (DSR) is calculated for an individual trip. In the illustrated example, the logic program evaluates the violations assessed for the specific trip 10-1 and calculates the DSR deduction 10-2. For example, has the driver previously or frequently violated stop signs and has the driver violated stop signs in the current trip now being evaluated? A deduction. e.g., surcharge 10-3 is applied to the current trip DSR based upon noted persistence in violations. The DSR for the current trip is calculated based upon the specific violations 10-4 assessed during the current trip. A total driver safety rating is calculated 10-5 based upon the relative duration of speed violations in the current trip, the relative duration within the current trip that the vehicle was operated over a selected speed and after sunset, the relative duration of the trip that acceleration was above a specified rate while the vehicle was moving at a specified speed determines a persistence or frequency factor for the assessed violation of the specific trip 10-2.

Figure 16:
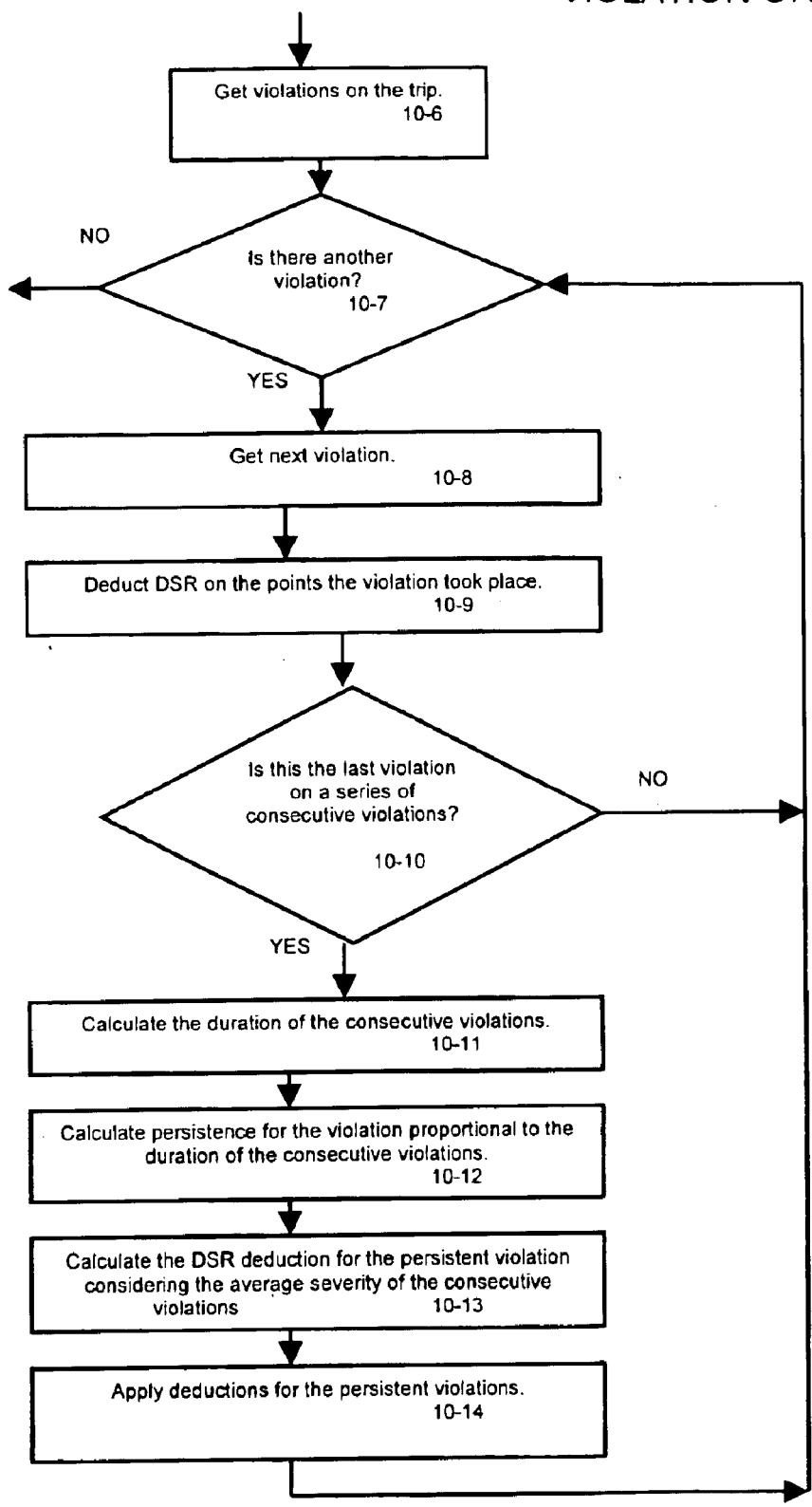
FIG. 16 illustrates the logic steps for deduction of penalty points from the DSR.

FIG. 16 illustrates the logic steps for deduction of penalty points from the DSR. The deduction of penalty points is "for violations on this trip". The violations are first collected 10-6. The logic program can review the trip information and collect each violation 10-7 & 10-8. A deduction is made for each violation 10-9. The logic program also determines if each violation is the last violation of a series of consecutive violations 10—10. If yes, the time duration of the consecutive violation is calculated 10-11. The persistence for the violation proportional to the duration of the consecutive violation is calculated 10-12.

Figure 17:
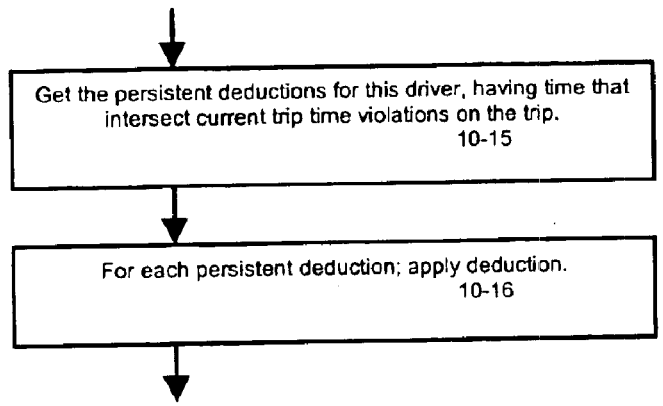
FIG. 17 illustrates the deduction of past penalty points from a calculated DSR for a separate and later driving event.

FIG. 17 illustrates the deduction of past penalty points from a calculated DSR for a separate and later driving event. The logic program obtains persistent deductions for the specific driver 10-15. A deduction is applied for each persistent violation 10-16. Past violations are deemed to be "persistent violations" if there is a sufficient (and variable) time correlation between the past violation and the violation of the current trip being evaluated. There must be a time overlap or "intersect".

Figure 18:
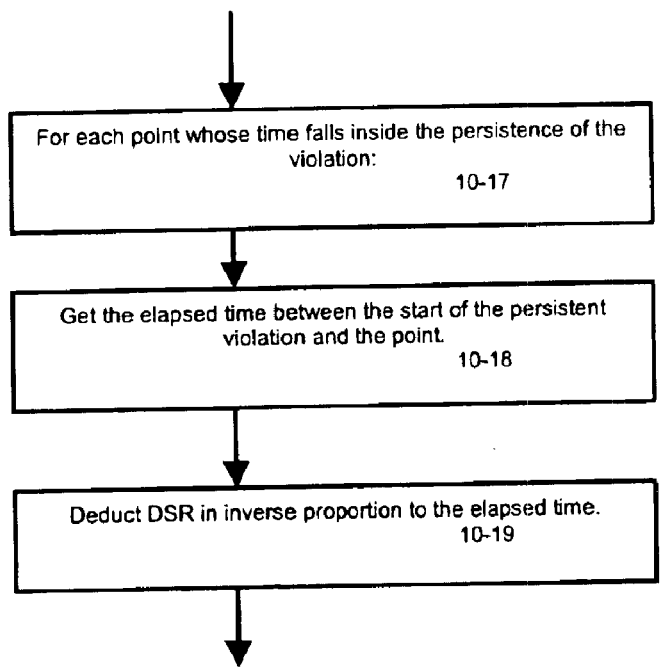
FIG. 18 illustrates the application of past penalties utilizing weighting scheme based upon penalty weight inverse to elapsed time.

FIG. 18 illustrates the application of past penalties utilizing weighting scheme based upon penalty weight inverse to elapsed time. Again, however, only violations within or "inside" a specified time zone are deemed to be persistent violations and factored into the DSR for the current trip.

In addition to selection of identifiable vehicle operators, the invention will allow for recording and evaluation of multiple separate trips by a selected driver. The separate trips can be separated by trips of longer than a specified duration, trips in which there are multiple braking events per selected period of time, trips on weekends or at night, in contrast to morning commutes. Also the trips may be separated, evaluated and contrasted over time. Of course, numerous other variations may be implemented and are within the scope of this invention. It will be readily appreciated that changes in sequentially recorded vehicle speed can be used to calculate the rate of vehicle acceleration. See FIG. 8. Changes of vehicle position between intervals where there is no recorded vehicle speed, particularly in conjunction with immediate prior de-acceleration, may indicate that the vehicle is skidding. Minimal change in vehicle position relative to rapid acceleration may indicate the vehicle is being operated without sufficient traction, i.e., "spinning the wheels" or "pealing rubber".

Operation of the vehicle without headlights, changes in vehicle direction without turn signals, etc. may also be recorded. The frequency and degree of changed vehicle direction per unit of distance traveled can indicate lane weaving or, alternatively, driving on a winding road. The vehicle speed, calculated rate of acceleration/de-acceleration, number and duration of brake activation can all be correlated to assess the operator's performance and driving behavior. Frequent changes in vehicle speed and braking events may be indicative of aggressive driving such as tail gating slower moving traffic and lane weaving. Since the data is collected centrally, comparisons can be made between drivers and driver profile types can thus be created.

In one embodiment of the invention, the evaluation of data comprises events of vehicle speed, compliance with traffic signs and signals, vehicle acceleration and time of day. See FIG. 10

It will be further appreciated that evaluation of these additional or alternative variables will require minimal adjustment to the logic flow diagrams (FIGS. 3 through 18). For example, driving after selected times on Friday and Saturday evenings may be rated independent of other variables since these times are statistically the most dangerous times. Again, the time of vehicle operation, and designation of the driver, will be included in the data set for the preferred embodiment.

FIGS. 19A, 19B, 19C and 19D comprise a table of actual recorded time marked speed data and assessed violation/penalty utilizing an embodiment of the invention. FIGS. 19A through 19D comprise a table of data points collected from an actual motor vehicle trip 19-1 utilizing OBDII and GPS components, and evaluated 19-2 by the subject invention. The table presents only collected data points in which a speed violation 19-6 was recorded. It will be appreciated that the table could present vehicle speed information for each sequential data point regardless of an excess speed event (or other recorded vehicle operation characteristic). In the event depicted in FIGS. 19A through 19D, the trip started at a time prior to 1:55:29 PM on Dec. 29, 2003. The vehicle speed was collected every 2-seconds and the vehicle position was also recorded at the same 2 second intervals. Both recording devices utilized atomic clocks to regulate time intervals and synchronization. The speed limit information 19-4 applicable to the specific road and location traveled was recorded in the CPU evaluating the data. The actual vehicle location was derived by the GPS supplied information.

For the driving event ("trip") subject of FIG. 19, the identity of the driver is disclosed. The actual speed is recorded and compared to the posted speed limit for each time marked interval.

A driver safety rating (DSR) 19-8 is established upon the evaluation of the data. In the driving event subject of FIG. 19, only driving speed having been recorded as exceeding the pre-selected criteria, i.e., posted speed limit has been displayed. (See for example 19-3, 19-5 & 19-6.)

In the embodiment of the invention illustrated by FIG. 2, a driver safety rating is established by first evaluating the recorded data of FIG. 1 in accordance with a formula and subtracting the resulting numerical value ($\sigma$) from 100 where 100 represents optimally safe motor vehicle operation. The formula utilized in this embodiment is:

$$\sigma = (V^2 - L^2)/(L \cdot x) \text{ where}$$

$\sigma$=driver safety rating speed violation deduction
V=vehicle speed recorded from OBDII
L=posted speed limit obtained from a GIS database utilizing the GPS location stamp for the data interval.
x=adjustment factor to normalize the deduction to a basis DSR of 100.

As stated above, the driver safety rating (DSR)=100−$\sigma$.

In another embodiment, the product of the calculation can be adjusted by a factor ($\mu$) where $\mu$=an adjustment factor for traffic conditions, weather conditions or time of day. It will be readily appreciated that operation of a vehicle at a speed in excess of the posted limit may be subject to a greater penalty or evaluative numerical significance if occurring in rain, icy conditions, nighttime, etc. Other factors which may justify a further adjustment criteria would include operating a vehicle in excess of the posted speed in a school zone, during rush hour or on roads that have statistically higher accident rates.

It will be further appreciated that the information contained in the table comprising FIGS. 19A through 19D illustrates the one data collection sequence that may utilized and recorded on the transferable electronic memory media and downloaded to a separate CPU.

Figure 20:
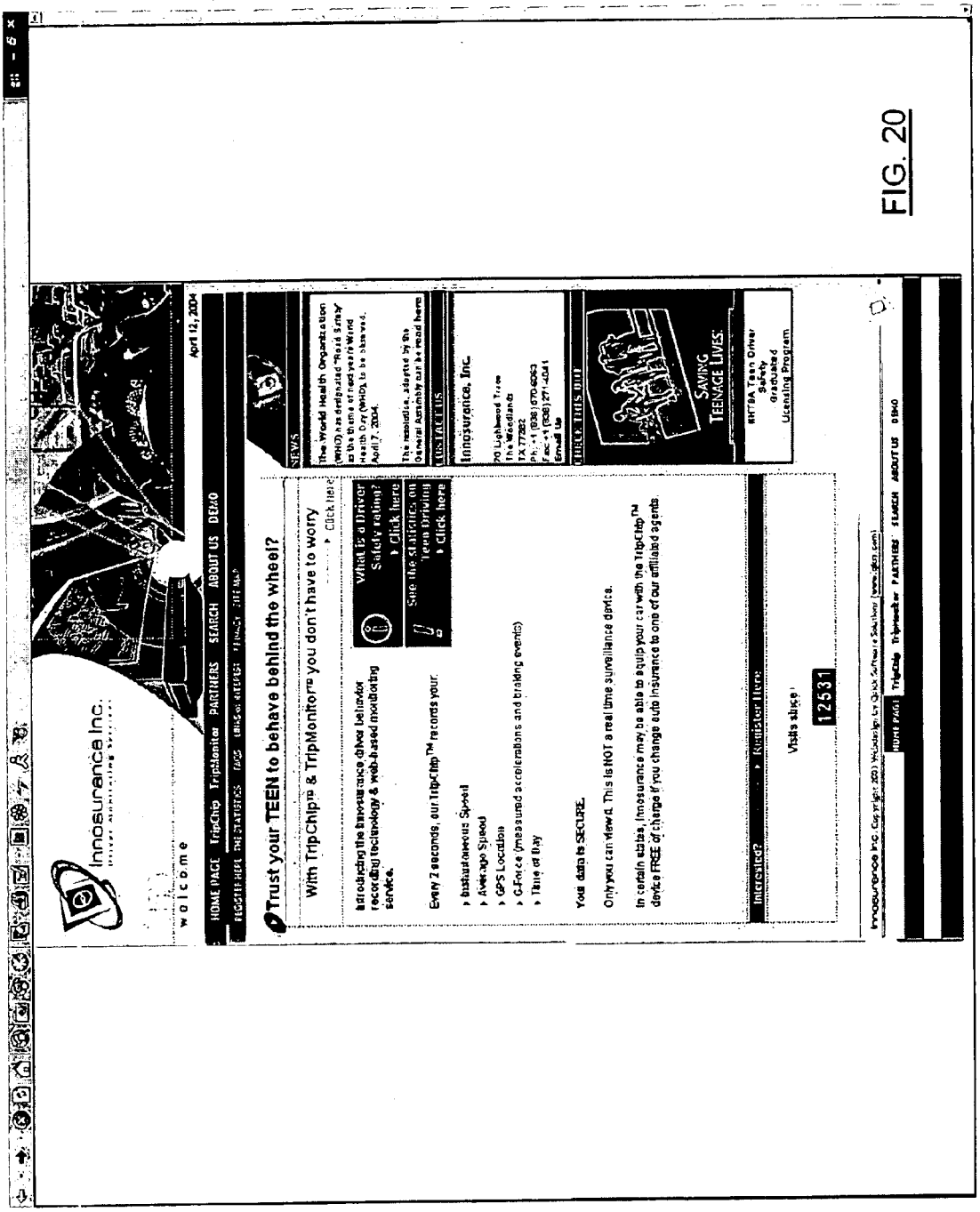
FIG. 20 illustrates the home page displayed to a user of an embodiment of the invention that incorporates the logic flow sequences illustrated in FIGS. 2 through 18 herein.

FIG. 20 illustrates the home page displayed to a user of an embodiment of the invention that incorporates the logic flow sequences illustrated in FIGS. 2 through 18 herein.

FIG. 21 illustrates the log in page displayed 21-1 to a user of an embodiment of the invention.

Figure 22:
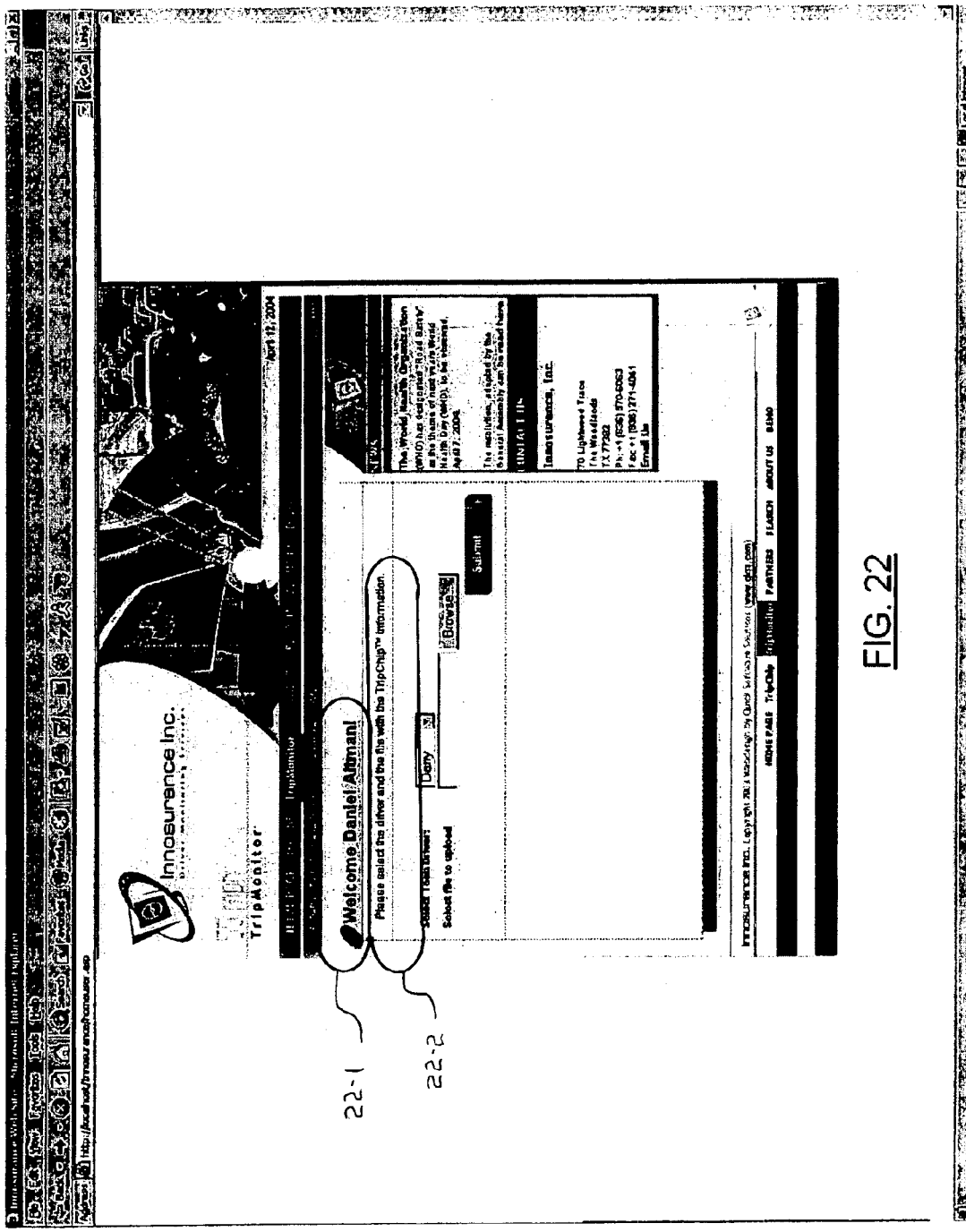
FIG. 22 illustrates the screen page displayed to the user after logging into the invention allowing the user to select among multiple drivers having recorded driving data uploaded within the database of the invention.

FIG. 22 illustrates the screen page displayed to the user 22-1 after logging into the invention allowing the user to select 22-2 among multiple drivers having recorded driving data uploaded within the database of the invention.

Figure 23:
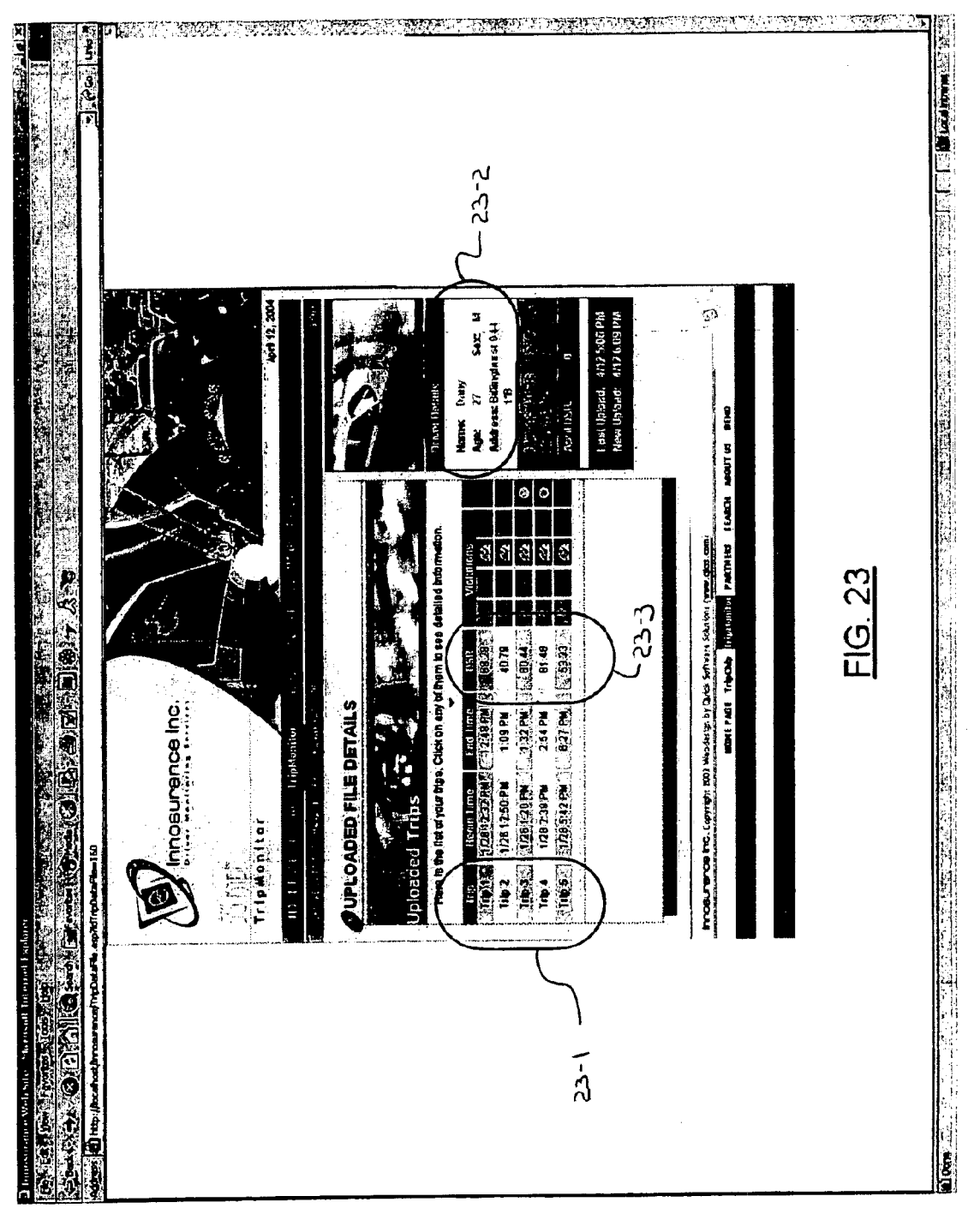

FIG. 23 illustrates the screen display allowing the user to view various driving events 23-1 of the selected driver 23-2 that are within the invention database and for which a Driver Safety Rating 23-3 has been computed.

Figure 24:
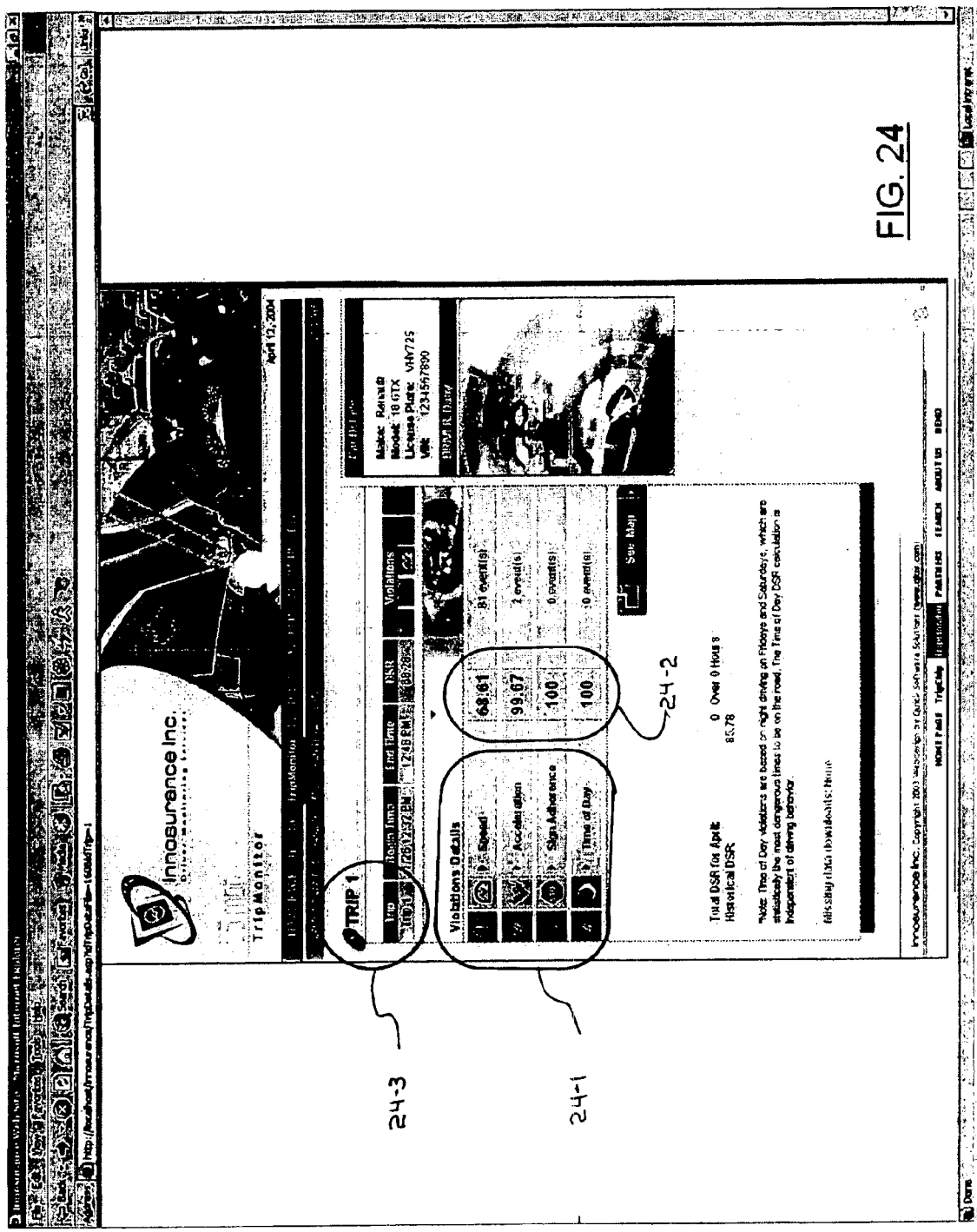
FIG. 24 illustrates the screen display providing the type of violation and computed DSR for each violation type for a selected trip.

FIG. 24 illustrates the screen display providing the type of violation 24-1 and computed DSR 24-2 for each violation type for a selected trip 24-3.

Figure 25:
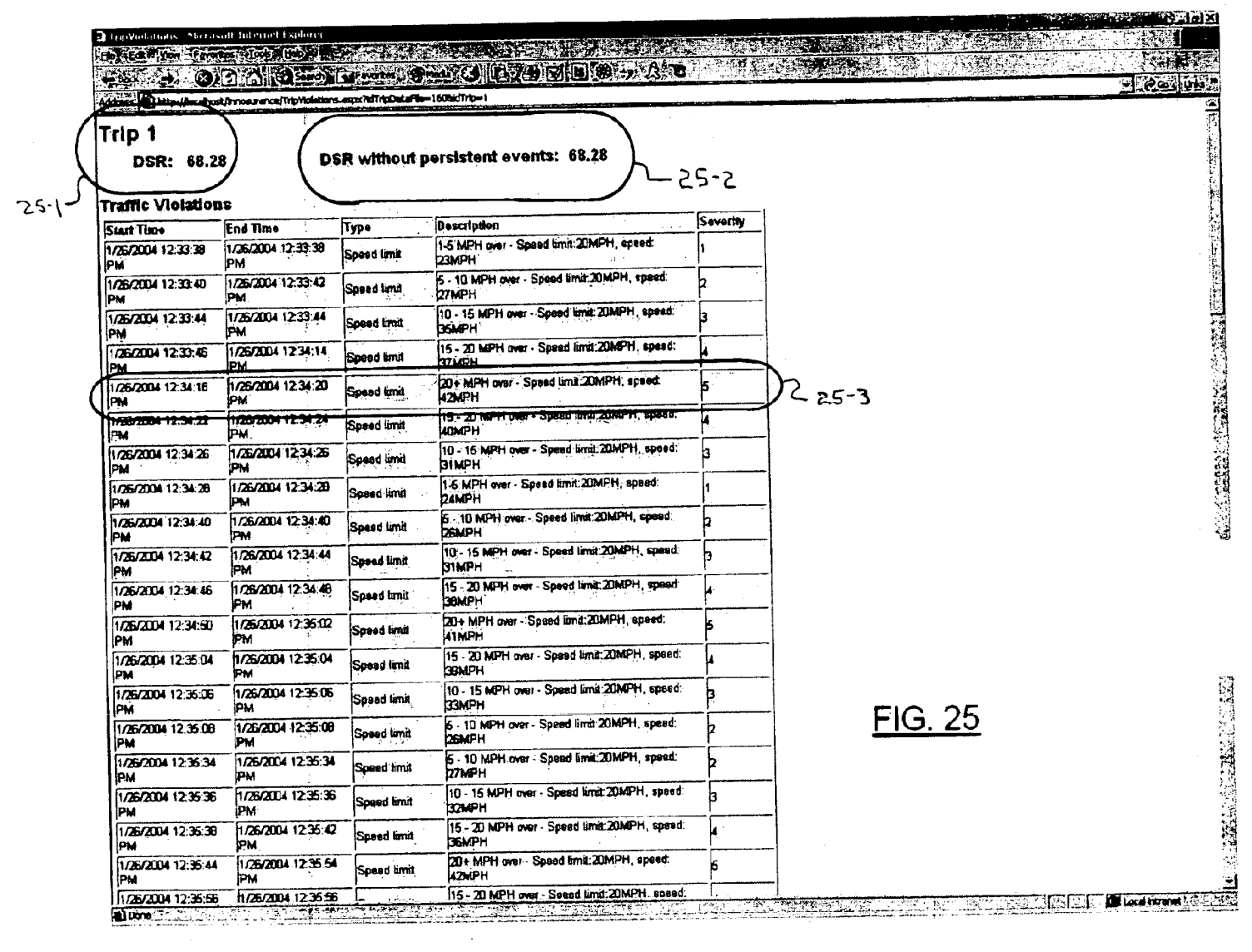

FIG. 25 illustrates the screen display of evaluated trip data 25-1. 25-2, & 25-3 derived from the matrix of time and location marked data. FIG. 25 is a presentation of information of the type of information of FIGS. 19A through 19D as it may appear on a user's computer screen.

Figure 26:
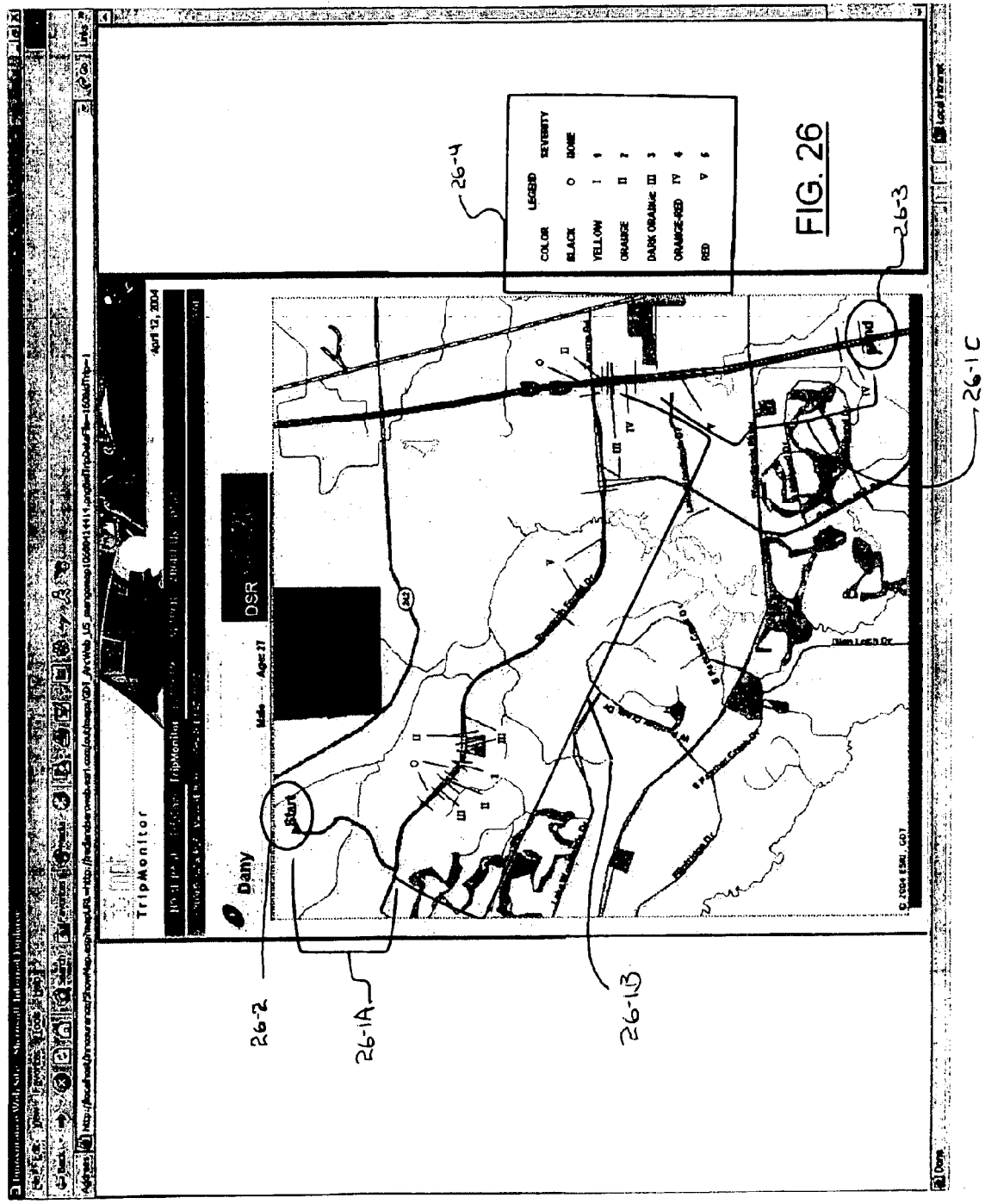
FIG. 26 illustrates a map of the actual travel of the vehicle as recorded and evaluated based upon several data bases utilizing the time marked and location marked data.

FIG. 26 illustrates a map of the actual travel of the vehicle as recorded and evaluated based upon several data bases utilizing the time marked and location marked data. FIG. 26 is a presentation of the GPS data 26-1A, 26-1B, 26-1C, 26-2 & 26-3, collected as part of the data set forth in FIG. 25, as it may appear on the user's computer screen and illustrating the actual route of vehicle travel. The designated path of travel may be further color coded 26-4 or otherwise marked to show the specific location of the event of excess speed or other characteristic included in the evaluation determining the driver safety rating.

FIG. 27 is a representation of the display screen of the invention showing the streets 27-1 traveled during a selected driving event as well as the time 27-2A & 27-2B and speed limit 27-3. The screen can be modified to incorporate other information.

Looking at FIGS. 8 and 9, it will of course be appreciated that sequential data of speed can be used to calculate the rate of acceleration. This can be either a positive or negative value with a negative value indicating de-acceleration. In one embodiment of the invention, the evaluation of data may utilize the following formula:

$$\Phi = (a - 0.6)/(L \cdot y) \text{ and}$$

$$A - (V_1 - V_2)/t$$

where
$\Phi$=driver safety rating acceleration deduction
$V_1$=vehicle velocity from the pervious time interval recorded from OBDII
$V_2$=vehicle velocity from the current time interval recorded from OBDII.
t=time increment between data points
L=speed limit
y=adjustment factor to normalize the deduction to a basis driver safety rating of 100.
0.6=threshold G-Force above which violations are recorded.

As with speed, the acceleration factor may be subject to a further adjustment ($\mu$) for traffic, road or weather conditions as well as for time of day, etc.

In another embodiment, the rating may include the operator's adherence to traffic control signs and traffic signals ($\phi$). This embodiment will require synchronized GPS and OBDII data. An example of application of this capability would be failure of the vehicle to stop at a geographic location, as determined by the combined and time synchronized GPS and OBDII data, known to be controlled by a stop sign. This can be viewed as an enhancement of the tracking speed with posted speed limits.

Yet another embodiment may utilize a separate factor ($\beta$) for travel at night or at determined road locations known to have greater accidents. Travel on Interstate highways traversing relatively sparsely populated and un-congested area may understandably present different operating challenges and demands than equal mileage driven in congested urban streets and expressways with great traffic density, frequently merging traffic and changing traffic speed. Similarly, the drivers' behavior, as well as driving skill, can be measured by the information metrics of the type depicted in FIG. 1.

In yet another embodiment, the driver safety rating will be weighted to reflect the number of separate operating events or the cumulative vehicle operation marked data that is incorporated in the rating. A rating that is a product of the evaluation of numerous events can be expected to have a greater accuracy or greater predictive values for other or future behavior.

The driver safety rating comprising an evaluation of multiple factors, e.g., speed, rate of acceleration, sign adherence and time of day/location, will be an integration of the recorded and derived factors. In one embodiment, the DSR will be a deduction of the evaluated numerical value from a beginning 100 score. The numerical value will first require computation of the DSR for each time-marked interval, e.g., each two second interval for which OBDII, GPS, etc., data is collected for evaluation.

In a simple calculation involving the four variables listed above, each variable can be given equal weight (with or without incorporating modifying factors such as $\mu$). In that case, the deduction for each time interval ($DSR_{INTERVAL}$) can simply be expressed as the average of the four values for that interval.

$$DSR_{INTERVAL} = (\sigma + \Phi + \phi + \beta)/4$$

The $DSR_{TRIP}$ will then be:

$$DSR_{TRIP} = 100 - (\Sigma DSR_{INTERVAL})/t$$

The invention includes altering or adding additional variables and varying the evaluation as may be selected utilizing recorded and uploaded data of vehicle operation as taught by this invention.

The evaluation process can also discard old or "stale" information that may be expected to no longer have significant predictive value. The criteria for discarding data may be a time function only, or incorporate the quantity of later data collected. The evaluation process can also incorporate a persistence factor for events of selected significance. These may be events of driving at speeds in excess of 20 mph over the posted speed limit. The rating evaluation process may retain the data or numerical values for a longer duration than data or values pertaining to driving less than 10 mph above a posted speed limit. This process can utilize the "severity" value listed in the table of FIGS. 19A through 19D.

Additional variable factors that may subject of analysis include the number of changes in rate of acceleration (including de-acceleration) per linear distance traveled, number of changes in vehicle direction per linear distance traveled, use of seat belts, turning signals, activation of ABS or SRS systems, etc.

The evaluation can also include quantitative assessments, such as an evaluation based upon changes in vehicle direction, determined from steering wheel movement, time, and vehicle speed. This can be correlated with GPS data for validation as indicated above. The data can then be further qualitatively assessed for excessive speed during turning events, excessive lane changes, etc. The qualitative assessment can include assigning numerical values for events. Events can be qualitative distinguished, i.e., an event of excessive driving speed, an event triggering the ABS or SRS system, could have a differing impact than an event of failure to activate turning signals.

An additional embodiment could include measurement of driver performance for a driving event or for operation per hour. The measurement can be stored and supplemented by additional driver specific driving events. Therefore changes in driver behavior over time can be evaluated, thereby providing a current, accurate assessment of behavior. With progression of time or collected events, it may be possible or advantageous to delete early events and data.

This specification is to be construed as illustrative only and is for the purpose of teaching those skilled in the art the manner of carrying out the invention. It is to be understood that the forms of the invention herein shown and describe are to be taken as the presently preferred embodiments. As already stated, various changes may be made in the shape, size and arrangement of components or adjustments made in the steps of the method without departing from the scope of this invention. For example, equivalent elements may be substituted for those illustrated and described herein and certain features of the invention may be utilized independently of the use of other features, all as would be apparent to one skilled in the art after having the benefit of this description of the invention.

Further modifications and alternative embodiments of this invention will be apparent to those skilled in the art in view of this specification.

What we claim is:

1. A method for rating driver behavior and operating performance utilizing recorded time related data of motor vehicle operation comprising:
   a. electronically recording time marked data at regular periodic intervals comprising
      i. engine start;
      ii. vehicle speed;
      iii. engine stop;
   b. uploading the data to a CPU;
   c. determining an excess speed event by the steps comprising
      i. determining a first time marked data point recording speed in excess of selected limits;
      ii. determining any sequentially recorded data points of speed in excess of selected limits to determine a time duration of the excess speed event;
      iii. evaluating the amount of excess speed for each sequentially recorded data point;
      iv. evaluating the speed event based upon the time duration and the amount of the speed in excess of the limit;
   d. repeating step c for each next non-sequential data point to determine a separate excess speed event;
   e. determining the duration of the trip;
   f. evaluating the excess speed events in relation to the trip duration; and
   g. recording the evaluation of the speed events, the trip duration and trip identifier.

2. The method of claim 1 further comprising the steps of:
   a. recording a GPS vehicle position for each recorded time marked data point; and
   b. evaluating the excess speed events with the vehicle location at the time of the event.

3. The method of claim 1 further comprising the step of evaluating the excess speed events in terms of the time of day.

4. The method of claim 1 further comprising the step of evaluating the excess speed events in terms of a driver history.

5. The method of claim 1 further comprising the steps of:
   a. recording a GPS vehicle position for each recorded time marked data point;
   b. determining the distance of the trip
   c. evaluating the excess speed events with the trip distance.

6. The method of claim 1 wherein the evaluation comprises computing a numerical value for the excess speed event.

7. The method of claim 6 wherein the evaluation comprises the steps of:
   a. Computing a driver safety rating speed violation deduction comprising the following steps:
      i. squaring the recorded speed to obtain a first product;
      ii. squaring the selected speed limit to obtain a second product;
      iii. subtracting the second product from the first product to obtain a third product;
      iv. determining a first adjustment factor;
      v. multiplying the first adjustment factor by the selected speed limit to obtain a first normalized value;
      vi. dividing the third product by the first normalized value to obtain a driver safety rating speed violation deduction
   b. repeating steps i through vi for each recorded speed value;
   c. computing the sum of driver safety rating speed violation deductions to obtain a gross speed violation deduction;
   d. dividing the gross speed violation deduction by the total number of recorded speed events to obtain the driver safety rating speed violation deduction;
   e. subtracting the driver safety rating speed violation deduction from 100 to obtain a trip Driver Safety Rating.

8. The method of claim 7 further comprising multiplying the first adjustment factor by a second adjustment factor wherein the second adjustment factor is an assigned value for at least one variable selected from a group consisting of road condition, traffic volume, weather condition, and time of day.

9. The method of claim 1 further comprising utilizing a plurality of time marked vehicle speeds to compute at least one vehicle acceleration rate.

10. The method of claim 9 further comprising determining events of acceleration rates in excess of selected limits.

11. The method of claim 9 further comprising:
    a. using each two sequential time marked data points of vehicle speed to compute the rate of vehicle acceleration;
    b. determining events of rates of acceleration in excess of selected limits from each two sequential data points;
    c. computing each duration of continued excess acceleration events from sequential data points having rates of acceleration in excess of the selected limits;
    d. evaluating the amount and duration of events of excess accelerations; the excess acceleration event value, and the trip distance; and
    e. recording the excess rate of acceleration value.

12. The method of claim 11 further comprising computing a numerical value for each excess acceleration event based upon the time duration and the amount of the rate of acceleration in excess of the limit.

13. The method of claim 11 further comprising the steps of:
    a. recording a GPS vehicle position for each recorded time marked data point;
    b. evaluating the excess acceleration events with the vehicle location;
    c. determining the distance of the trip; and
    d. evaluating the excess acceleration events with the trip distance.

14. The method of claim 11 wherein the evaluation comprises the following steps:
    a. Computing a driver safety rating speed violation deduction comprising the following steps:
       i. squaring the recorded speed to obtain a first product;
       ii. squaring the selected speed limit to obtain a second product;
       iii. subtracting the second product from the first product to obtain a third product;
       iv. determining a first adjustment factor;
       v. multiplying the first adjustment factor by the selected speed limit to obtain a first normalized value;
       vi. dividing the third product by the first normalized value to obtain a driver safety rating speed violation deduction;
    b. repeating steps i through vi for each recorded speed value;
    c. computing the sum of driver safety rating speed violation deductions to obtain a gross speed violation deduction;
    d. dividing the gross speed violation deduction by the total number of recorded speed events to obtain the driver safety rating speed violation deduction;
    e. computing a driver safety rating acceleration violation deduction comprising the following steps:
    f. subtracting a selected threshold G-Force from the excess rate of acceleration value to obtain a fourth product;
    g. determining an acceleration adjustment factor;
    h. multiplying the acceleration adjustment factor by the selected speed limit to obtain a second normalized value;
    i. dividing the fourth product by the second normalized value to obtain a driver safety rating acceleration violation deduction;
    j. repeating steps i through iv for each recorded excess rate of acceleration value;
    k. computing the sum of driver safety rating acceleration violation deductions to obtain a gross acceleration violation deduction;
    l. dividing the gross acceleration violation deduction by the total number of recorded acceleration events to obtain the driver safety rating acceleration violation deduction; and
    m. subtracting the driver safety rating acceleration violation deduction from 100 to obtain a trip Driver Safety Rating.

15. The method of claim 14 wherein the selected threshold G-Force is 0.6.

16. The method of claim 14 further comprising multiplying the acceleration adjustment factor by a fourth adjustment factor wherein the fourth adjustment factor is an assigned value for at least one variable selected from a group consisting of road condition, traffic volume, weather condition, and time of day.

* * * * *